(12) United States Patent
Yasui et al.

(10) Patent No.: US 12,140,200 B2
(45) Date of Patent: Nov. 12, 2024

(54) SHOCK ABSORBER

(71) Applicant: KYB CORPORATION, Tokyo (JP)

(72) Inventors: Takeshi Yasui, Tokyo (JP); Masaki Koyama, Tokyo (JP); Naoki Yamamoto, Tokyo (JP)

(73) Assignee: KYB Corporation, Tokyo (JP)

(*) Notice: Subject to any disclaimer, the term of this patent is extended or adjusted under 35 U.S.C. 154(b) by 335 days.

(21) Appl. No.: 17/690,752

(22) Filed: Mar. 9, 2022

(65) Prior Publication Data
US 2022/0316549 A1    Oct. 6, 2022

(30) Foreign Application Priority Data

Mar. 31, 2021    (JP) ................................. 2021-059091

(51) Int. Cl.
*F16F 9/516*    (2006.01)
*B60G 13/08*    (2006.01)
(Continued)

(52) U.S. Cl.
CPC .............. *F16F 9/516* (2013.01); *F16F 9/061* (2013.01); *F16F 9/065* (2013.01); *F16F 9/348* (2013.01); *B60G 13/08* (2013.01); *B60G 17/08* (2013.01); *B60G 2202/24* (2013.01); *B60G 2204/62* (2013.01); *B60G 2206/41* (2013.01);
(Continued)

(58) Field of Classification Search
CPC .. F16F 9/516; F16F 9/061; F16F 9/065; F16F 9/348; F16F 2222/12; F16F 2228/066; F16F 2230/42; F16F 2232/08; F16F 2234/02; B60G 13/08; B60G 17/08; B60G 2202/24;
(Continued)

(56) References Cited

U.S. PATENT DOCUMENTS 4,972,929 A * 11/1990 Ivers ..................... F16F 9/3484
188/322.22
5,975,258 A * 11/1999 Nezu ..................... F16F 9/5126
188/266.5
(Continued)

FOREIGN PATENT DOCUMENTS

JP    2019-183918 A    10/2019

*Primary Examiner* — Bradley T King
*Assistant Examiner* — James K Hsiao
(74) *Attorney, Agent, or Firm* — Paratus Law Group, PLLC

(57) ABSTRACT

A shock absorber is provided. The shock absorber of the present invention includes a shock absorber main body, a damping passage, a primary damping force generation component, and a secondary damping force generation component. The shock absorber main body has an outer tube and a rod and is stretchable. The damping passage communicates operating chambers with each other provided in the shock absorber main body. The primary and secondary damping force generation components are provided in series with the damping passage. The secondary damping force generation component includes a secondary valve, an annular facing portion, and a valve stopper. The annular facing portion faces the secondary valve with an annular gap between the annular facing portion and the secondary valve. The valve stopper has elasticity to allow bending, and when the secondary valve bends and comes in contact with the valve stopper, restricts the secondary valve from bending.

6 Claims, 9 Drawing Sheets

(51) Int. Cl.
*B60G 17/08* (2006.01)
*F16F 9/06* (2006.01)
*F16F 9/34* (2006.01)
*F16F 9/348* (2006.01)

(52) U.S. Cl.
CPC .. *B60G 2500/104* (2013.01); *B60G 2800/162* (2013.01); *F16F 2222/12* (2013.01); *F16F 2228/066* (2013.01); *F16F 2230/42* (2013.01); *F16F 2232/08* (2013.01); *F16F 2234/02* (2013.01)

(58) Field of Classification Search
CPC ............ B60G 2204/62; B60G 2206/41; B60G 2500/104; B60G 2800/162
See application file for complete search history.

(56) References Cited

U.S. PATENT DOCUMENTS

| | | | | |
|---|---|---|---|---|
| 6,340,081 | B1* | 1/2002 | Keil | F16F 9/348 188/322.22 |
| 6,668,986 | B2* | 12/2003 | Moradmand | F16F 9/466 188/266.2 |
| 8,820,495 | B2* | 9/2014 | King | F16F 9/348 188/289 |
| 8,950,559 | B2* | 2/2015 | de Kock | F16F 9/5126 188/322.22 |
| 9,587,703 | B2* | 3/2017 | Rummel | F16F 9/3484 |
| 9,777,790 | B2* | 10/2017 | Mizuno | F16F 9/3485 |
| 9,845,839 | B2* | 12/2017 | Rummel | F16F 9/18 |
| 10,316,923 | B2* | 6/2019 | Tsuji | F16F 9/44 |
| 2005/0263363 | A1* | 12/2005 | Katou | F16F 9/3485 188/322.22 |
| 2008/0314704 | A1* | 12/2008 | Deferme | F16F 9/3481 188/266 |
| 2009/0242341 | A1* | 10/2009 | Ashiba | F16F 9/348 188/283 |
| 2009/0260938 | A1* | 10/2009 | Hikosaka | F16F 9/3484 188/322.15 |
| 2012/0018264 | A1* | 1/2012 | King | F16F 9/348 188/282.1 |
| 2014/0262655 | A1* | 9/2014 | Tuts | F16F 9/512 188/322.15 |
| 2015/0210136 | A1* | 7/2015 | Teraoka | F16F 9/3487 188/282.1 |
| 2016/0356335 | A1* | 12/2016 | Nomura | F16F 9/19 |
| 2018/0080520 | A1* | 3/2018 | Tsuji | F16F 9/103 |
| 2021/0010557 | A1 | 1/2021 | Kimishima et al. | |

* cited by examiner

SHOCK ABSORBER

CROSS REFERENCE TO PRIOR APPLICATION

This application claims priority to Japanese Patent Application No. 2021-059091 (filed on Mar. 31, 2021), which is hereby incorporated by reference in its entirety.

BACKGROUND

Technical Field

The present invention relates to a shock absorber.

Related Art

A shock absorber is, for example, installed between the vehicle body and the axle in the vehicle and causes the damping force generated upon its contraction and extension to reduce the vibration of the vehicle body and the wheels, leading to the improved ride quality of the vehicle.

Such a shock absorber includes, for example, a cylinder, a piston rod, a piston, a free piston, a damping passage, and a damping force generation component. The piston rod is movably inserted into the cylinder. The piston is slidably inserted into the cylinder and divides the inside of the cylinder into an extension side chamber and a compression side chamber. The free piston is slidably inserted into the cylinder and comparts the compression side chamber to form the gas chamber below the compression side chamber in the cylinder. The damping passage is provided in the piston to communicate the extension side chamber with the compression side chamber. The damping force generation component is provided in the damping passage.

Shock absorbers for vehicles have been recently desired to have damping force characteristics to improve the vehicle ride quality. Specifically, the damping force characteristics are achieved by increasing the damping coefficient to increase the damping force in a short time in response to the switching between extension and contraction strokes in a very low-speed range where the extension and contraction speed is lower than the low speed. Furthermore, in the low-speed range, the damping coefficient is made smaller than in the very low-speed range. In the high-speed range exceeding the low speed, the damping coefficient is made smaller than in the low-speed range while being proportional to the extension and contraction speed. Thus, for example, JP 2019-183918 A discloses the shock absorber provided with the damping force generation component having the primary valve and the secondary valve in series with the damping passage. The primary valve generates a damping force mainly when the extension and contraction speeds are low and high, and the secondary valve generates a damping force mainly when the extension and contraction speed is very low.

The primary valve includes an extension side leaf valve and a compression side leaf valve. The extension side leaf valve opens and closes the extension side port provided on the piston, and the compression side leaf valve opens and closes the compression side port provided on the piston. In a case where the pressure in the extension side chamber exceeds the pressure in the compression side chamber and a difference between two pressure levels (differential pressure) reaches the valve opening pressure, the extension side leaf valve opens the extension side port to offer resistance against the flow of hydraulic operating fluid from the extension side chamber to the compression side chamber. In a case where when the pressure in the compression side chamber exceeds the pressure in the extension side chamber and the difference between the pressure levels (differential pressure) reaches the valve opening pressure, the compression side leaf valve opens the compression side port to offer resistance against the flow of hydraulic operating fluid from the compression side chamber to the extension side chamber. Moreover, the notch is provided in the valve seat on which the extension side leaf valve or the compression side leaf valve is seated. The valve seat is provided on the piston. Upon the close of the valve, the compression side chamber is communicated with the extension side chamber by means of the notch.

Further, the secondary valve is an annular leaf valve having an inner circumferential side fixed and an outer circumferential side allowed to bend. The secondary valve faces an inner circumference of the annular facing portion arranged on its outer circumferential side with an annular gap therebetween. The secondary valve offers resistance against the flow of hydraulic operating fluid between the extension side chamber and the compression side chamber.

Furthermore, in a case where the extension and contraction speed of the shock absorber is in the very low-speed range, the secondary valve does not bend to a significant extent and keeps the annular gap with the annular facing portion small. Thus, the damping force characteristics of the damping force rise in a short time by the secondary valve depending on the extension and contraction speed. In a case where the extension and contraction speed of the shock absorber is in the low-speed range, the secondary valve bends significantly, which makes the flow path area in the annular gap larger than that of the notch in the piston, and so the shock absorber generates a damping force by means of the notch. Besides, in a case where the extension and contraction speed of the shock absorber is in the high-speed range, the leaf valve on the extension side or compression side of the primary valve bends to open the port on the extension side or compression side, which makes the damping coefficient in the shock absorber smaller than that at the very low speed and at the low speed. The secondary valve and the primary valve of the shock absorber in the related art operating as described above enable the shock absorber to achieve the damping force characteristics suitable for the vehicle.

SUMMARY

As described above, in the shock absorber in the related art, the secondary valve does not affect the damping force characteristics at the low speed by allowing the free end on its outer circumferential side to bend significantly. However, in a case where the secondary valve bends excessively due to the differential pressure when the extension and contraction speed of the shock absorber is in the high-speed range, the secondary valve is likely to be unable to withstand the stress. Thus, the shock absorber in the related art is provided with the valve stopper that faces the secondary valve with a gap between the valve stopper and the secondary valve in the axial direction. In the case where the secondary valve bends by a predetermined deflection amount or more, the valve stopper comes into contact with the outer circumferential side of the secondary valve to restrict the secondary valve from further bending beyond the bending of the secondary valve.

In this way, the shock absorber in the related art provided with the valve stopper is capable of protecting the secondary valve, but the restriction of bending of the secondary valve using the valve stopper leads to a failure to increase the flow path area further. Thus, there is a case in the shock absorber in the related art where the extension and contraction speed reaches the very high-speed range beyond the high-speed range. In this case, the flow path area restricted by the secondary valve is made smaller than the flow path area in the flow path created by the primary valve separated from the piston, which can make the damping force excessive, as illustrated in FIG. 9, resulting in the impaired ride quality of the vehicle.

Further, in the case where the shock absorber is the single-cylinder shock absorber, the pressure in the compression side chamber fails to increase above the pressure in the gas chamber. This is because the volume that varies as the piston rod moves forward is compensated by extending and contracting the gas chamber formed by comparting the inside of the cylinder with the free piston. Thus, if the shock absorber is the single-cylinder shock absorber, in the structure of the shock absorber in the related art, the secondary valve supported by the valve stopper limits the flow path area. The damping force on the compression side reaches the upper limit in a short time, which causes the extension side chamber to be negative pressure. Accordingly, upon switching the extension and contraction direction of the shock absorber into the extension direction, the damping force fails to be exerted in a short time, which may cause abnormal noise.

Thus, the present invention is intended to provide a shock absorber capable of improving the vehicle ride quality and reducing the occurrence of abnormal noise.

In order to solve the above-described problems, a shock absorber according to the present invention includes a shock absorber main body having an outer tube and a rod and configured to be stretchable extendable and contractable, the rod being inserted movably into the outer tube, a damping passage configured to communicate two operating chambers provided in the shock absorber main body, and primary and secondary damping force generation components provided in series with the damping passage, in which the secondary damping force generation component includes a secondary valve, an annular facing portion, and a valve stopper, the secondary valve is annular with elasticity and is provided in the damping passage, one of inner and outer circumferences of the secondary valve being fixed to be a fixed end and the other being a free end to allow bending, the annular facing portion faces the free end of the secondary valve with an annular gap between the annular facing portion and the free end of the secondary valve, and the valve stopper is annular and faces the secondary valve in an axial direction with a gap between the valve stopper and the secondary valve, and when the secondary valve bends and comes into contact with the valve stopper, holds back the secondary valve from further bending, in which the valve stopper has an inner circumference used as a fixed end in a case of using the inner circumference of the secondary valve as the fixed end, and the valve stopper, in a case of using the outer circumference of the secondary valve as the fixed end, has an outer circumference used as a fixed end and an opposite circumference used as a free end, allowing the free end to bend.

According to the shock absorber configured as described above, the secondary valve that is bent by the pressure received from the front surface side is supported by the elastic valve stopper on the back surface side when coming into contact with the valve stopper, and the valve stopper bends together with the secondary valve as the extension and contraction speed of the shock absorber increases, which makes it possible for the stress on the secondary valve to reduce and the annular gap to increase depending on the contraction speed of the shock absorber.

DETAILED DESCRIPTION

Figure 1:
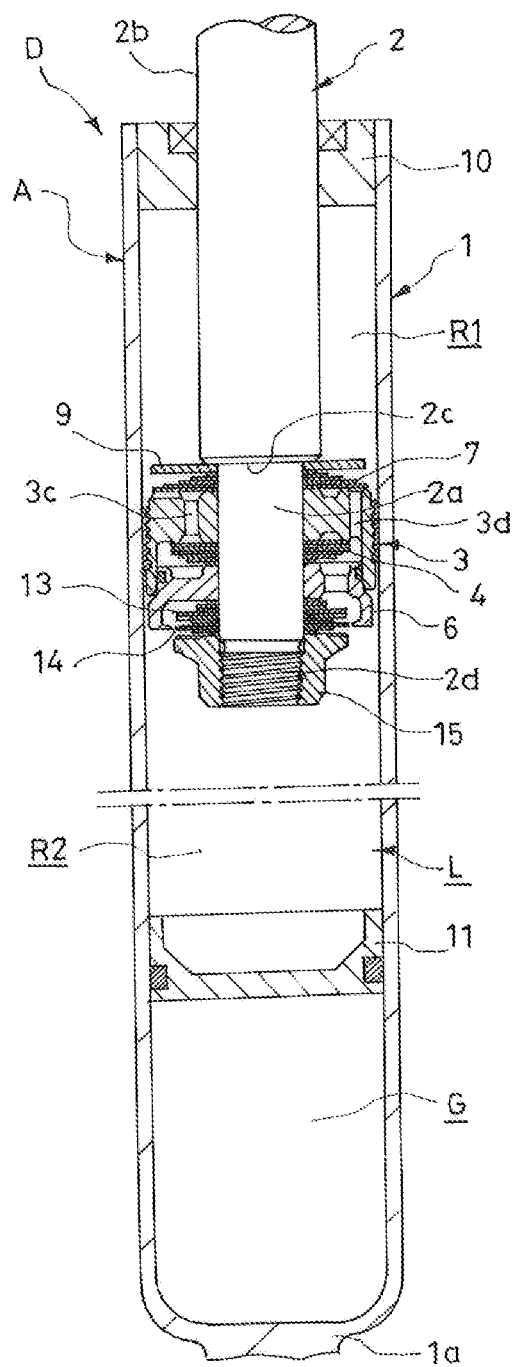
FIG. 1 is a longitudinal cross-sectional view of a shock absorber according to a first embodiment of the present invention.
Figure 2:
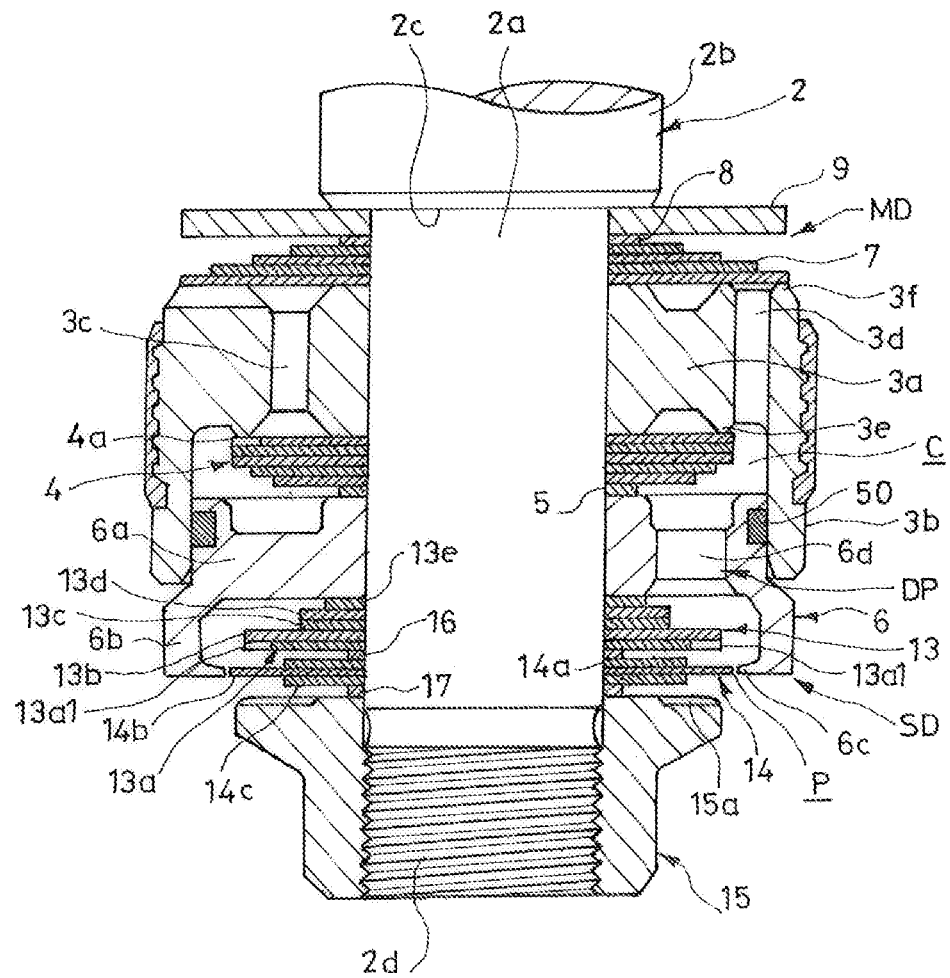
FIG. 2 is a partially enlarged cross-sectional view of the shock absorber according to the first embodiment of the present invention.

Hereinafter, the present invention will be described based on the embodiments illustrated in the drawings. As illustrated in FIGS. 1 and 2, a shock absorber D according to a first embodiment includes a shock absorber main body A, a damping passage DP, a primary damping force generation component MD, and a secondary damping force generation component SD. The shock absorber main body A is extendable and contractable and has a cylinder 1 used as an outer tube and a rod 2 movably inserted into the cylinder 1. The damping passage DP communicates an extension side chamber R1 with a compression side chamber R2, which are used as operating chambers provided in the shock absorber main body A. The primary damping force generation component MD and the secondary damping force generation component SD are provided in the damping passage DP. Furthermore, the shock absorber D is arranged between the vehicle body and the axle in a vehicle (not illustrated) to absorb or dampen the vibration of the vehicle body and wheels.

Each part of the shock absorber D is now described in detail. As illustrated in FIG. 1, the shock absorber main body A includes the bottomed cylindrical cylinder 1 used as the outer tube and the rod 2 movably inserted into the cylinder 1, as well as a piston 3. The piston 3 is connected to the rod 2 and movably inserted into the cylinder 1. The piston 3 is also used as a partition member that comparts the inside of the cylinder 1 into the extension side chamber R1 and the compression side chamber R2 used as operating chambers.

Furthermore, the rod 2 has a base end at which a bracket (not illustrated) is provided. The base end of the rod corresponds to the upper end in FIG. 1. The rod 2 is connected to one of the vehicle body and the axle with the bracket. In addition, the cylinder 1 has a bottom portion 1a on which a bracket (not illustrated) is also provided and is connected to the other of the vehicle body and the axle by means of the bracket.

The shock absorber D is interposed between the vehicle body and the axle in this way. Thus, in the case where the wheels vibrate up and down with respect to the vehicle body, such as a case where a vehicle travels on an uneven road surface, the rod 2 moves in and out of the cylinder 1, which causes the shock absorber D to extend and contract and the piston 3 to move up and down (axial direction) in the cylinder 1.

Further, the shock absorber main body A is provided with an annular rod guide 10 that closes an upper end of the cylinder 1 and allows the rod 2 to be slidably inserted into its inner circumference. Thus, the cylinder 1 has a closed space inside. Furthermore, when viewed from the piston 3 in the cylinder 1, a free piston 11 is slidably inserted into the side opposite to the rod 2.

On the upper side of the free piston 11 in the cylinder 1, a liquid chamber L is formed, and on the lower side, a gas chamber G is formed. Besides, the piston 3 comparts the liquid chamber L into the extension side chamber R1 on the side of the rod 2 and the compression side chamber R2 on the side of the piston 3. The extension side chamber R1 and the compression side chamber R2 are filled with liquid. Moreover, examples of a liquid filled in the shock absorber main body A include hydraulic operating fluid, water, an aqueous solution, other liquids, and the like. On the other hand, the gas chamber G is filled with a gas such as air or nitrogen gas in a compressed state.

Furthermore, upon extension of the shock absorber D, the rod 2 retracts from the cylinder 1, which increases the volume inside the cylinder by the retracted volume of the rod 2. In this case, the free piston 11 moves upward in the cylinder 1, expanding the gas chamber G. On the contrary, upon contraction of the shock absorber D, the rod 2 extends in the cylinder 1, which decreases the volume inside the cylinder by the advanced volume of the rod 2. In this case, the free piston 11 moves downward in the cylinder 1, shrinking the gas chamber G.

Moreover, instead of the free piston 11, a bladder, bellows, or the like can be used to compart the liquid chamber L and the gas chamber G. The configuration of such a movable partition wall functioning as the partition can be changed as appropriate.

Besides, in the present embodiment, the shock absorber D is the single rod, single-cylinder shock absorber. Upon extension and contraction of the shock absorber D, the gas chamber G is expanded or shrunk by the free piston (the movable partition wall) 11, compensating for the volume of the rod 2 moving into and out of the cylinder 1. However, the configuration for such volume compensation can also be changed as appropriate.

In one example, a twin-cylinder shock absorber can be formed without the free piston (the movable partition wall) 11 and the gas chamber G by providing an outer shell on the outer circumference of the cylinder 1 to form a reservoir for storing liquid between the cylinder 1 and the outer shell. In this case, the reservoir enables the volume of the rod 2 moving into and out of the cylinder 1 to be compensated. Moreover, the reservoir can be formed in a stationary tank separately from the cylinder 1. In addition, the shock absorber D can be configured as a double-rod type in which the piston 3 is mounted in the center of the rod 2 and both ends of the rod 2 project from both ends of the cylinder 1 to the outside of the cylinder 1.

The rod 2 has a small-diameter portion 2a provided on the tip side of the rod 2, a step portion 2c provided at the boundary between the small-diameter portion 2a and a large-diameter portion 2b on the upper side in FIG. 2, and a screw portion 2d provided on the outer circumference of the tip of the small-diameter portion 2a.

Furthermore, the piston 3 is annular and is used as the partition member. The piston 3 is fitted to the outer circumference of the small-diameter portion 2a of the rod 2, fixing to the rod 2 by a piston nut 15 screwed to the screw portion 2d of the rod 2. More specifically, the piston 3 includes a main body portion 3a, a cylindrical portion 3b, a plurality of extension side ports 3c, a plurality of compression side ports 3d, an extension side valve seat 3e, and a compression side valve seat 3f. The main body portion 3a has an annular shape. The cylindrical portion 3b is provided on the outer circumference of the main body portion 3a, which is at the lower end in FIG. 2. The extension side ports 3c are provided on the same circumference of the main body portion 3a and pass through the main body portion 3a in the axial direction. The compression side ports 3d are provided on the same circumference on the outer circumferential side of the main body portion 3a on the side farther than the extension side port 3c and pass through the main body portion 3a in the axial direction. The extension side valve seat 3e has an annular shape and is provided between the extension side port 3c and the compression side port 3d in the main body portion 3a at the lower end in FIG. 2, to surround the extension side port 3c. The compression side valve seat 3f has a petal shape and is provided in the main body portion 3a at the upper end in FIG. 2, individually surrounding only openings of the compression side port 3d while avoiding the extension side port 3c.

Continuing the description, on the lower surface of the piston 3 in FIG. 2, an extension side leaf valve 4 and a spacer 5 are superimposed. The extension side leaf valve 4 is a stacked leaf valve whose inner circumferential side is fixed to the small-diameter portion 2a of the rod 2 to open and close the extension side port 3c. The spacer 5 has an annular shape with an outer diameter smaller than that of the extension side leaf valve 4 and sets the position of a bending fulcrum of the extension side leaf valve 4. Besides, below the spacer 5, a secondary valve case 6, a valve stopper 13, and a secondary valve 14 are superimposed. The secondary valve case 6 has an annular shape and has an inner circumference fixed to the small-diameter portion 2a of the rod 2. The valve stopper 13 and the secondary valve 14 are annular.

Further, on the upper surface of the piston 3 in FIG. 2, a compression side leaf valve 7, a spacer 8, and a stopper 9 are superimposed. The compression side leaf valve 7 is used as a primary valve that is a stacked leaf valve whose inner circumferential side is fixed to the small-diameter portion 2a of the rod 2 to open and close the compression side port 3d. The spacer 8 is an annular shape that sets the position of the bending fulcrum of the compression side leaf valve 7 and has a smaller outer diameter than the compression side leaf valve 7.

These stopper 9, spacer 8, compression side leaf valve 7, piston 3, extension side leaf valve 4, spacer 5, secondary valve case 6, valve stopper 13, and secondary valve 14 are sequentially assembled to the outer circumference of the small-diameter portion 2a of the rod 2. Furthermore, they are sandwiched between the piston nut 15 screwed to the screw portion 2d at the tip of the rod 2 and the step portion 2c of the rod 2, fixing to the rod 2. Furthermore, the primary damping force generation component MD includes the piston 3 and the compression side leaf valve 7. In addition, the compression side port 3d of the piston 3 constitutes a part of the damping passage DP. In other words, in the shock absorber D according to the present embodiment, the primary damping force generation component MD includes the compression side leaf valve 7 as a primary valve used to open and close the damping passage DP.

The extension side leaf valve 4 is a stacked leaf valve configured by stacking a plurality of annular plates and has the inner circumference fixed to the rod 2 as described above. The extension side leaf valve 4 is stacked on the lower end of the piston 3 in FIG. 2 and is seated on the extension side valve seat 3e of the piston 3. On the outer circumference of the leaf valve stacked on the uppermost side in FIG. 2 and seated on the extension side valve seat 3e among the leaf valves constituting the extension side leaf valve 4, a notch orifice 4a is provided. Thus, the extension side leaf valve 4 communicates the extension side port 3c surrounded by the extension side valve seat 3e with the compression side chamber R2 by means of only the notch orifice 4a in a state of being seated on the extension side valve seat 3e. Moreover, the extension side leaf valve 4 does not block the inlet of the compression side port 3d even in the state of being seated on the extension side valve seat 3e.

Furthermore, in a case where the differential pressure between the pressure in the extension side chamber R1 acting on the front surface side and the pressure in the compression side chamber R2 acting on the back surface side through the extension side port 3c reaches the valve opening pressure, the extension side leaf valve 4 bends its outer circumference to be spaced apart from the extension side valve seat 3e. The spacing of the extension side leaf valve 4 from the extension side valve seat 3e forms an annular gap between the extension side leaf valve 4 and the extension side valve seat 3e. This gap allows the extension side port 3c to communicate with the compression side chamber R2, offering resistance against the flow of liquid passing through the extension side port 3c. In the shock absorber D according to the present embodiment, the extension side leaf valve 4 opens when the extension speed of the shock absorber D is in the high-speed range and offers resistance against the flow of liquid from the extension side chamber R1 to the compression side chamber R2 through the extension side port 3c. In addition, the extension side leaf valve 4 sets the extension side port 3c as a one-way passage that allows only the flow of liquid from the extension side chamber R1 to the compression side chamber R2.

In addition, the extension side valve seat 3e protrudes further downward in FIG. 2 than an abutment surface of the main body portion 3a in contact with the inner circumference of the extension side leaf valve 4. The extension side valve seat 3e and the main body portion 3a are set with a difference in height (difference of elevation). This difference in height causes the outer circumference of the extension side leaf valve 4 to bend when the extension side leaf valve 4 is superimposed on the piston 3 and has the inner circumferential side fixed to the outer circumference of the rod 2. In this way, the extension side leaf valve 4 is given an initial bending in advance and presses itself against the extension side valve seat 3e with the elastic force exerted by the extension side leaf valve 4 itself. Thus, the extension side leaf valve 4 does not open until the force for bending the extension side leaf valve 4 due to the differential pressure between the extension side chamber R1 and the compression side chamber R2 overcomes the pressing force due to the elastic force mentioned above. The differential pressure at the valve opening becomes the valve opening pressure of the extension side leaf valve 4. Thus, the valve opening pressure of the extension side leaf valve 4 is adjustable by the flexural rigidity of the extension side leaf valve 4 and the initial deflection amount of bending given to the extension side leaf valve 4.

The compression side leaf valve 7 used as the other leaf valve is a stacked leaf valve configured by stacking a plurality of annular plates and has the inner circumference fixed to the rod 2 as described above. The compression side leaf valve 7 is stacked on the upper end of the piston 3 in FIG. 2 and is seated on the compression side valve seat 3f of the piston 3. The compression side leaf valve 7 closes only the compression side port 3d surrounded by the compression side valve seat 3f in a state of being seated on the compression side valve seat 3f but does not close the inlet of the extension side port 3c. Furthermore, in a case where the differential pressure between the pressure in the compression side chamber R2 acting on the front surface side and the pressure in the extension side chamber R1 acting on the back surface side through the compression side port 3d reaches a first differential pressure as the valve opening pressure, the compression side leaf valve 7 bends its outer circumference to be spaced apart from the compression side valve seat 3f. Furthermore, the compression side leaf valve 7 opens the compression side port 3d and offers resistance against the flow of the liquid passing through the compression side port 3d. In the shock absorber D according to the present embodiment, the compression side leaf valve 7 opens when the contraction speed of the shock absorber D is in the high-speed range and offers resistance against the flow of liquid from the compression side chamber R2 to the extension side chamber R1 through the compression side port 3d. In addition, the compression side leaf valve 7 sets the compression side port 3d as a one-way passage that allows only the flow of liquid from the compression side chamber R2 to the extension side chamber R1. Moreover, the valve opening pressure of the compression side leaf valve 7 is adjustable by the flexural rigidity of the compression side leaf valve 7 and the initial deflection amount of bending given to the compression side leaf valve 7, similarly to the extension side leaf valve 4. Moreover, in place of the notch orifice 4a in the extension side leaf valve 4, or in addition to the notch orifice 4a, a notch orifice can be provided on the outer circumference of the leaf valve seated on the compression side valve seat 3f among the stacked leaf valves constituting the compression side leaf valve 7 or an orifice formed by notch or stamping can be provided on the compression side valve seat 3f.

Moreover, the extension side leaf valve 4 and the compression side leaf valve 7 are stacked leaf valves formed by stacking a plurality of annular plates. The number of annular plates to be stacked can be changed depending on the damping force to be intended to occur in the shock absorber D as appropriate, and they can be a leaf valve composed of only one annular plate. In addition, the extension side leaf valve 4 and the compression side leaf valve 7 can be valves having a configuration other than the leaf valve or the stacked leaf valve. The use of a leaf valve or stacked leaf valve using a thin annular plate makes it possible to achieve a satisfactory stroke length of the shock absorber D with ease while preventing the total length of the piston portion of the shock absorber D from being longer.

Further, the extension side leaf valve 4 and the compression side leaf valve 7 are supported on their inner circumferences by the respective spacers 5 and 8, and their outer circumferential sides that are not supported by the spacers 5 and 8 are allowed to bend. Thus, setting the outer diameters of the spacers 5 and 8 makes it possible to change the positions of the bending fulcrums of the extension side leaf valve 4 and the compression side leaf valve 7. Moreover, the spacers 5 and 8 can include a plurality of annular washers.

The stopper 9 comes into contact with the outer circumference of the compression side leaf valve 7 when the compression side leaf valve 7 bends significantly, restricting further bending of the compression side leaf valve 7 to protect the compression side leaf valve 7.

Furthermore, the secondary damping force generation component SD includes the secondary valve 14, an annular facing portion 6c, and the valve stopper 13. The secondary valve 14 has an annular shape whose inner circumference is fixed to the outer circumference of the small-diameter portion 2a of the rod 2. The annular facing portion 6c is an annular protrusion formed along the circumferential direction on the inner circumference of a cylindrical case portion 6b of the secondary valve case 6. The valve stopper 13 faces the secondary valve 14 with a gap between them in the axial direction.

The secondary valve case 6 includes a fitting portion 6a, a case portion 6b, and the annular facing portion 6c. The fitting portion 6a has an annular shape and is fitted to the inner circumference of the cylindrical portion 3b of the piston 3. The case portion 6b has a cylindrical shape that protrudes downward from the outer peripheral portion of the lower end of the fitting portion 6a. The annular facing portion 6c is formed as an annular protrusion that projects to the inner circumference side formed along the circumferential direction on the inner circumference of the case portion 6b. Furthermore, the space between the fitting portion 6a and the cylindrical portion 3b is closed with a seal 50. In the fitting portion 6a, a subordinate port 6d is formed. The subordinate port 6d is open to the inner circumferential side of the case portion 6b and passes through the fitting portion 6a in the axial direction. In addition, the annular valve stopper 13 and the annular secondary valve 14 with their inner circumferences mounted on the outer circumference of the small-diameter portion 2a of the rod 2 are housed inside the case portion 6b.

When the fitting portion 6a of the secondary valve case 6 is fitted to the cylindrical portion 3b of the piston 3, a space C is formed between the secondary valve case 6 and the piston 3. The space C is communicated with the extension side chamber R1 through the extension side port 3c and the compression side port 3d and is communicated with the compression side chamber R2 through the subordinate port 6d. Thus, the subordinate port 6d and the space C form the damping passage DP together with the compression side port 3d.

Figure 3:
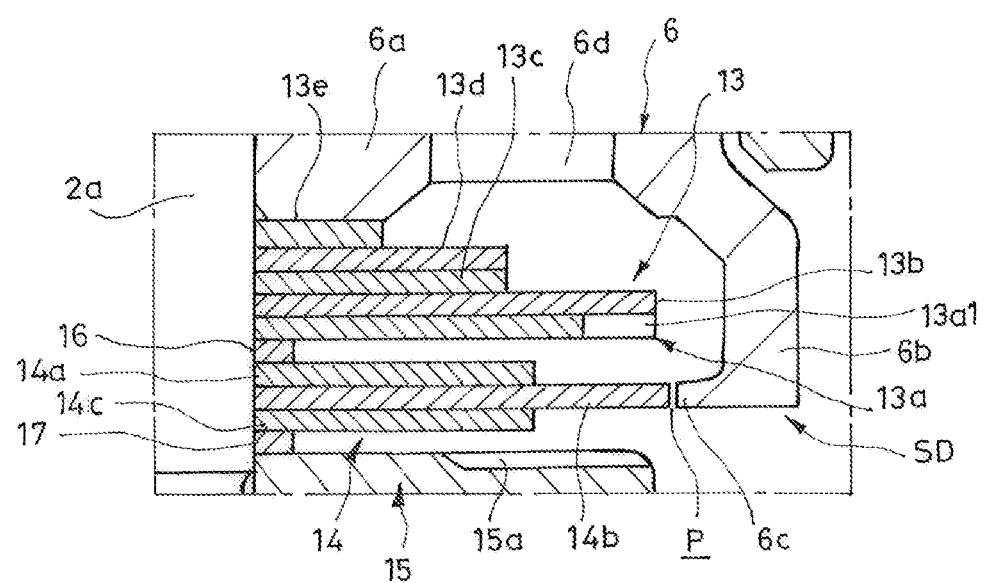
FIG. 3 is an enlarged cross-sectional view of a secondary damping force generation component of the shock absorber according to the first embodiment of the present invention.

The secondary valve 14 according to the present embodiment is annular and includes three leaf valves 14a, 14b, and 14c stacked on top of each other, as illustrated in FIG. 3. These leaf valves have inner circumferential sides fixed to the small-diameter portion 2a of the rod 2 to be fixed ends, and their outer circumferential sides are free ends to allow bending. The central leaf valve 14b of these three leaf valves 14a, 14b, and 14c has an outer diameter larger than the outer diameters of the leaf valves 14a and 14c located at upper and lower ends, respectively. Moreover, the number of leaf valves constituting the secondary valve 14 can be optionally set depending on the damping force intended to be obtained by the shock absorber D and can be a single number, besides a plurality.

Furthermore, the secondary valve 14 is positioned at a position where the outer circumferential surface of the central leaf valve 14b faces the inner circumferential surface of the annular facing portion 6c provided in the secondary valve case 6 and is fixed to the small-diameter portion 2a of the rod 2. In addition, in the present embodiment, the secondary valve 14 is sandwiched between spacers 16 and 17 having inner circumferences of a small diameter. The spacers 16 and 17 are annular plates whose outer diameters are smaller than those of the leaf valves 14a, 14b, and 14c constituting the secondary valve 14. The secondary valve 14 is fixed to the small-diameter portion 2a of the rod 2, with its inner peripheral portion sandwiched between the spacers 16 and 17. Thus, the secondary valve 14 can be elastically deformed and bends with its outer circumferential side in the vertical direction in FIG. 2, using the outer peripheral edges of the spacers 16 and 17 as fulcrums. Moreover, although each of the spacers 16 and 17 includes one annular plate as illustrated, each can include a plurality of annular plates.

Furthermore, the valve stopper 13 has elasticity and is annular. The valve stopper 13 is mounted on the small-diameter portion 2a of the rod 2 while being sandwiched between the spacer 16 and the inner circumferential side of the fitting portion 6a in the secondary valve case 6. Specifically, in the shock absorber D according to the present embodiment, the valve stopper 13 includes five annular plates 13a, 13b, 13c, 13d, and 13e having inner circumferences fixed to the small-diameter portion 2a. The valve stopper 13 faces the upper surface of the secondary valve 14 in FIG. 2 in the axial direction through a gap corresponding to the thickness of the spacer 16.

The annular plate 13a is closest to the secondary valve 14 in the axial direction, and the annular plate 13b is superimposed on the opposite side of the secondary valve with respect to the annular plate 13a. The annular plates 13a and 13b are formed as annular plates having an outer diameter that can support the leaf valve 14b when coming into contact with the leaf valve 14b having the largest diameter if the leaf valve 14b bends. In addition, the two annular plates 13c and 13d are stacked on the opposite side of the secondary valve side with respect to the annular plate 13b. These annular plates 13c and 13d are formed as annular plates having the same inner diameter as the annular plates 13a and 13b and having outer diameters smaller than those of the annular plates 13a and 13b. Besides, the annular plate 13e is stacked farthest from the secondary valve 14 among the annular plates 13a, 13b, 13c, 13d, and 13e. The annular plate 13e has the same inner diameter as the annular plates 13a, 13b, 13c, and 13d and has an outer diameter smaller than those of the annular plates 13a, 13b, 13c, and 13d. These annular plates 13a, 13b, 13c, and 13d all have elasticity, and their inner circumferences are supported. Thus, their inner circumferential sides are used as fixed ends, and the outer peripheral edge of the annular plate 13e is used as a fulcrum, so their outer circumferential sides used as free ends are allowed to bend. Despite this bending of the annular plates, the entire valve stopper 13 has a higher flexural rigidity than the secondary valve 14 including the leaf valves 14a, 14b, and 14c. Moreover, in one example, the annular plates 13a, 13b, 13c, and 13d constituting the valve stopper 13 and the leaf valves 14a, 14b, and 14c can be formed by including the same material. In this case, making the flexural rigidity of the valve stopper 13 higher than that of the secondary valve 14 can be achieved by making the annular plates 13a, 13b, 13c, and 13d thicker than the leaf valves 14a, 14b, and 14c or by manufacturing the annular plates 13a, 13b, 13c, and 13d with a material having higher flexural rigidity than that of the leaf valves 14a, 14b, and 14c.

Furthermore, the secondary valve case 6, the valve stopper 13, the spacer 16, the secondary valve 14, and the spacer 17 are sequentially stacked below the extension side leaf valve 4 in FIG. 2. They are assembled to the outer circumference of the small-diameter portion 2a of the rod 2. Furthermore, they are fixed to the rod 2 by the piston nut 15 screwed to the screw portion 2d of the rod 2. Furthermore, as illustrated in FIG. 3, the leaf valve 14b of the secondary valve 14 has the outer circumferential surface facing the inner circumferential surface of the annular facing portion 6c with its inner circumference fixed, and so the leaf valve 14b faces the annular facing portion 6c with a predetermined annular gap P therebetween. In the shock absorber D according to the present embodiment, the secondary valve 14 fixed to the small-diameter portion 2a of the rod 2 has the inner circumference used as a fixed end. The outer circumferential surface of the central leaf valve 14b located on the outer circumferential side of the secondary valve 14 is a free end that can move in the vertical direction with respect to the annular facing portion 6c provided in the secondary valve case 6. Moreover, adjusting the plate thickness or the number of stacked plates of the annular plates constituting the spacers 16 and 17 allows the leaf valve 14b of the secondary valve 14 to be positioned to face the inner circumferential surface of the annular facing portion 6c.

Furthermore, in the state where the shock absorber D is stopped without extension or contraction, the secondary valve 14 does not bend and is kept in the initial mounting state illustrated in FIG. 3. As described above, in the state where the secondary valve 14 does not bend, as illustrated in FIG. 3, the leaf valve 14b of the secondary valve 14 faces the annular facing portion 6c with the predetermined annular gap P therebetween, with its outer circumferential surface facing the inner circumferential surface of the annular facing portion 6c. Furthermore, in the shock absorber D according to the present embodiment, the annular gap P formed between the leaf valve 14b and the annular facing portion 6c has a very narrow width and has an opening area smaller than that of the notch orifice 4a described above.

On the other hand, when the shock absorber D starts to move (extends and contracts), the secondary valve 14 bends. The deflection amount of bending of the secondary valve 14 increases as the extension and contraction speed increases. Furthermore, in a case where the extension and contraction speed of the shock absorber D approaches 0 (zero) such as when the extension begins, the deflection amount of bending of the secondary valve 14 is very small. The secondary valve 14 bends to the extent that it fails to face the inner circumferential surface of the annular facing portion 6c between the very low-speed range and the low-speed range, and then the secondary valve 14 opens. Besides, in the case where the extension speed of the shock absorber D is in the low-speed range or the high-speed range, the outer peripheral portion of the secondary valve 14 bends significantly downward with the outer circumference of the spacer 17 used as the bending fulcrum. On the contrary, in the case where the contraction speed of the shock absorber D is in the low-speed range or the high-speed range, the outer peripheral portion of the secondary valve 14 bends significantly upward with the outer circumference of the spacer 16 used as the bending fulcrum. The differential pressure between the extension side chamber R1 and the compression side chamber R2 when the secondary valve 14 bends and is spaced apart from the annular facing portion 6c to open, that is, the valve opening pressure of the secondary valve 14 is lower than that of the extension side leaf valve 4 and the compression side leaf valve 7. In the case where the extension and contraction speed is in the low-speed range, the secondary valve 14 opens as described above, but the extension side leaf valve 4 and the compression side leaf valve 7 do not open, and the liquid flows back and forth between the extension side chamber R1 and the compression side chamber R2 through the notch orifice 4a.

Moreover, when the annular gap P is set to be substantially zero in the state of the leaf valve 14b facing the inner circumferential surface of the annular facing portion 6c, the differential pressure occurs between the extension side chamber R1 and the compression side chamber R2 immediately upon the start of the shock absorber D to move. Thus, it is possible for the shock absorber D to generate a damping force in a short time in switching its extension and contraction.

As described above, upon the extension of the shock absorber D, the secondary valve 14 is under the pressure in the extension side chamber R1 and bends downward in FIG. 2. Upon the contraction of the shock absorber D, the secondary valve 14 is under the pressure in the compression side chamber R2 and bends upward in FIG. 2. Moreover, the description regarding the operation of the secondary valve 14 is given that the front surface of the secondary valve 14 is the surface to which the high pressure is applied and the back surface of the secondary valve 14 is the surface to which the low pressure is applied. Thus, in the shock absorber D according to the present embodiment, upon the extension operation, the front surface of the secondary valve 14 is the surface facing the extension side chamber side to which high pressure is applied, and its back surface is the surface facing the compression side chamber side to which low pressure is applied. Upon the contraction operation, the front surface of the secondary valve 14 is the surface facing the compression side chamber side to which high pressure is applied, and its back surface is the surface facing the extension side chamber side to which low pressure is applied.

Moreover, in the low-speed range and high-speed range where the outer peripheral portion of the secondary valve 14 bends vertically, the opening area of the annular gap formed between the leaf valve 14b of the secondary valve 14 displaced vertically and the annular facing portion 6c becomes larger than that of the notch orifice 4a.

Further, when the flow rate of the liquid flowing through the damping passage DP increases and the secondary valve 14 bends significantly, the valve stopper 13 located above the secondary valve 14 comes into contact with the upper end surface of the leaf valve 14b in FIG. 3. Specifically, when the upper surface of the secondary valve 14 in FIG. 3 comes into contact with the valve stopper 13, the valve stopper 13 supports the secondary valve 14 and holds back the secondary valve 14 from bending toward the upper side in FIG. 3 to protect the secondary valve 14. Moreover, the overall flexural rigidity of the valve stopper 13 and the secondary valve 14 in the state of the valve stopper 13 coming in contact with the secondary valve 14 is smaller than that of the extension side leaf valve 4. In addition, the valve stopper 13 includes a notch 13a1 formed from the outer circumference of the annular plate 13a facing the secondary valve 14 toward its inner circumferential side. The notch 13a1 communicates a gap defined by the secondary valve 14 and the valve stopper 13 with the outside to prevent the gap from being a closed space even if the leaf valve 14b comes into contact with the valve stopper 13. This notch 13a1 makes it possible to prevent the leaf valve 14b from adhering to the valve stopper 13 even if the leaf valve 14b comes into contact with the valve stopper 13. This prevents the closing delay in the secondary valve 14 when the secondary valve 14 comes into contact with the valve stopper 13 and then operates toward the valve closing side.

Besides, in the case where the flow rate of the liquid flowing through the damping passage DP increases and the secondary valve 14 bends significantly, the piston nut 15 located below the secondary valve 14 comes into contact with the lower end surface of the leaf valve 14b in FIG. 3. The piston nut 15 restricts the secondary valve 14 from further bending downward in FIG. 3 to protect the secondary valve 14. Thus, the piston nut 15 is used to fix the secondary valve case 6, the secondary valve 14, the valve stopper 13, and the spacers 16 and 17 to the outer circumference of the rod 2, and functions as a stopper to restrict the secondary valve 14 from further bending downward in FIG. 3.

In addition, the piston nut 15 includes a notch 15a formed from the outer circumference on the upper surface in FIG. 3 facing the secondary valve 14 toward its inner circumferential side. The notch 15a communicates a gap defined by the secondary valve 14 and the piston nut 15 with the outside to prevent the gap from being a closed space even if the leaf valve 14b comes into contact with the piston nut 15. This notch 15a makes it possible to prevent the leaf valve 14b from adhering to the piston nut 15 when the leaf valve 14b comes into contact with the piston nut 15. This prevents the closing delay in the subordinate port 6d of the secondary valve 14 when the secondary valve 14 opens at a maximum and then operates toward the valve closing side.

Furthermore, the liquid, when flowing through the damping passage DP from the extension side chamber R1 to the compression side chamber R2, passes through the extension side leaf valve 4 and the secondary valve 14 in the secondary damping force generation component SD, as described above. The liquid, when flowing through the damping passage DP from the compression side chamber R2 to the extension side chamber R1, passes through the compression side leaf valve 7 used as the primary valve in the primary damping force generation component MD and the secondary valve 14 in the secondary damping force generation component SD, as described above. In this way, the primary damping force generation component MD and the secondary damping force generation component SD are provided in series with the damping passage DP.

The operation of the shock absorber D according to the present embodiment is now described. Upon the extension of the shock absorber D, the piston 3 moves upward in the cylinder 1 to compress the extension side chamber R1. In the case where the extension speed of the shock absorber D is in the very low-speed range and approaches zero, the pressure in the extension side chamber R1 rises, but the differential pressure between the extension side chamber R1 and the compression side chamber R2 does not reach the valve opening pressure of the extension side leaf valve 4. Thus, the extension side leaf valve 4 does not open and the extension side port 3c remains closed. The compression side leaf valve 7 is under the pressure in the extension side chamber R1 from the side of its back surface and closes the compression side port 3d. In the case where the extension speed of the shock absorber D approaches zero, the pressure in the extension side chamber R1 rises but the differential pressure between the extension side chamber R1 and the compression side chamber R2 does not reach the valve opening pressure of the secondary valve 14. Thus, even if the secondary valve 14 bends, its outer circumferential surface faces the range of the axial width of the inner circumference of the annular facing portion 6c, resulting in the valve closing state. This maintains the flow path area of the annular gap P between the secondary valve 14 and the annular facing portion 6c to be extremely small. Besides, during the increase in the extension speed of the shock absorber D changing from the very low-speed range to the low-speed range, the differential pressure between the pressure in the extension side chamber R1 and the pressure in the compression side chamber R2 exceeds the valve opening pressure of the secondary valve 14. Thus, the secondary valve 14 bends so that its outer circumference deviates downward in FIG. 3 from the range of the axial width of the inner circumference of the annular facing portion 6c. Furthermore, the secondary valve 14 is open, which increases the flow path area of the annular gap P between the secondary valve 14 and the annular facing portion 6c.

Figure 4:
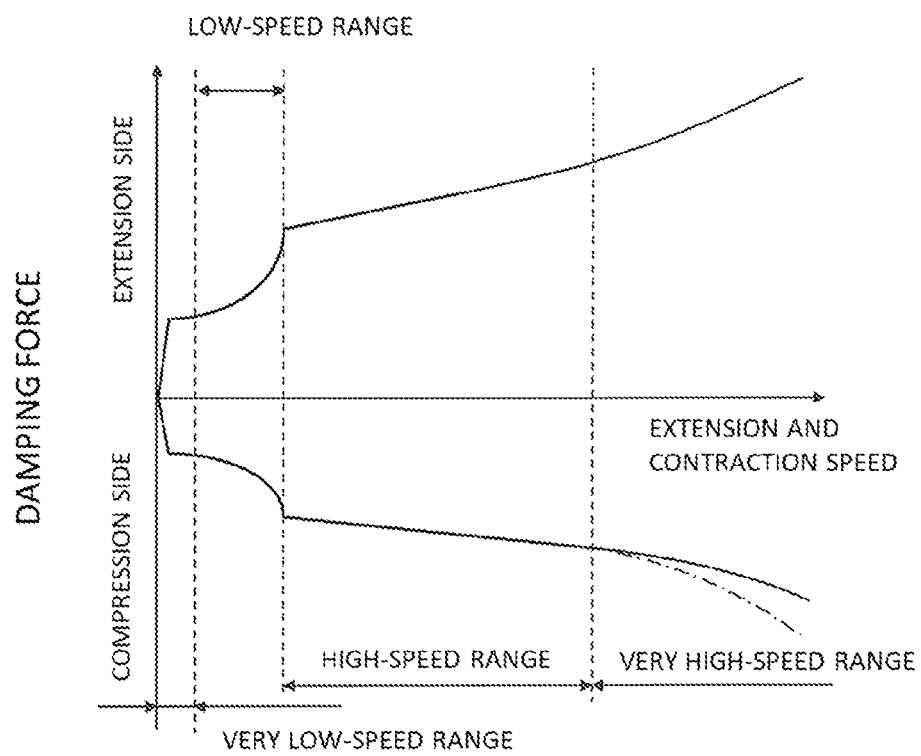
FIG. 4 is a diagram illustrating the damping force characteristics of the shock absorber according to the first embodiment of the present invention.

Furthermore, the liquid moves from the extension side chamber R1 to the compression side chamber R2 through the notch orifice 4a, the extension side port 3c, the space C, the subordinate port 6d, and the annular gap P. The liquid, when passing through the damping passage DP as described above, passes through the notch orifice 4a and the annular gap P but the flow path area of the annular gap P in the secondary valve 14 in the valve opening state in the very low-speed range becomes smaller than that of the notch orifice 4a. Thus, in the case where the extension speed of the shock absorber D is in the very low-speed range, the shock absorber D generates a damping force that hinders the extension mainly due to the resistance offered to the liquid by the secondary valve 14. Thus, in the case where the extension speed of the shock absorber D is in the very low-speed range, the damping force characteristics on the extension side of the shock absorber D (characteristics of the damping force with respect to the extension speed of the shock absorber D) are such that the damping coefficient rises very large at the extension speed near zero and then decreases at the opening of the secondary valve 14, as illustrated in FIG. 4.

In the case where the extension speed of the shock absorber D goes beyond the very low-speed range and falls in the low-speed range, the pressure in the extension side chamber R1 rises, but the differential pressure between the pressure in the extension side chamber R1 and the pressure in the compression side chamber R2 does not reach the valve opening pressure of the extension side leaf valve 4. Thus, the extension side leaf valve 4 has not yet opened in this state, and the extension side port 3c remains closed. The compression side leaf valve 7 is under the pressure in the extension side chamber R1 from the side of its back surface and closes the compression side port 3d. In the case where the extension speed of the shock absorber D is in the low-speed range, the differential pressure between the pressure in the extension side chamber R1 and the pressure in the compression side chamber R2 exceeds the valve opening pressure of the secondary valve 14. Thus, secondary valve 14 bends so that its outer circumference deviates downward in FIG. 3 from the range of the axial width of the inner circumference of the annular facing portion 6c. Furthermore, the secondary valve 14 is open, which increases the flow path area of the annular gap P between the secondary valve 14 and the annular facing portion 6c. Thus, in this case as well, the liquid moves from the extension side chamber R1 to the compression side chamber R2 through the notch orifice 4a, the extension side port 3c, the space C, the subordinate port 6d, and the annular gap P, but the flow path area of the annular gap P becomes larger than the flow path area of the notch orifice 4a. Thus, in the case where the extension speed of the shock absorber D is in the low-speed range, the shock absorber D generates a damping force that hinders the extension mainly due to the resistance offered to the liquid by the notch orifice 4a. Thus, in the case where the extension speed of the shock absorber D is in the very low-speed range, the damping force characteristics on the extension side of the shock absorber D is proportional to the square of the extension speed of the shock absorber D, which is peculiar to the orifice, as illustrated in FIG. 4. This is the characteristics in which the damping coefficient becomes smaller than the case where the extension speed is in the very low-speed range.

Besides, in the case where the extension speed of the shock absorber D goes beyond the low-speed range and falls in the high-speed range, the differential pressure between the pressure in the extension side chamber R1 and the pressure in the compression side chamber R2 reaches the valve opening pressure of the extension side leaf valve 4, and the extension side leaf valve 4 bends and is open, which opens the extension side port 3c. The compression side leaf valve 7 is under the pressure in the extension side chamber R1 from the side of its back surface and closes the compression side port 3d. In the case where the extension speed of the shock absorber D is in the high-speed range, the differential pressure between the pressure in the extension side chamber R1 and the pressure in the compression side chamber R2 exceeds the valve opening pressure of the secondary valve 14. Thus, the secondary valve 14 is open, which makes the flow path area of the annular gap P between the secondary valve 14 and the annular facing portion 6c large. The liquid passes between the extension side leaf valve 4 and the extension side valve seat 3e through the extension side port 3c, the space C, the subordinate port 6d, and the annular gap P, and moves from the extension side chamber R1 to the compression side chamber R2. In the case where the extension speed of the shock absorber D is in the high-speed range, the flow rate of the liquid moving from the extension side chamber R1 to the compression side chamber R2 increases. Thus, the secondary valve 14 bends significantly, and the flow path area in the gap between the extension side leaf valve 4 and the extension side valve seat 3e becomes smaller than that in the annular gap P. Thus, in the case where the extension speed of the shock absorber D is in the high-speed range, the shock absorber D generates a damping force that hinders the extension mainly due to the resistance offered to the liquid by the extension side leaf valve 4. Thus, in the case where the extension speed of the shock absorber D is in the high-speed range, the damping force characteristics on the extension side of the shock absorber D is proportional to the extension speed of the shock absorber D, which is peculiar to the extension side leaf valve 4, as illustrated in FIG. 4. This is the characteristics in which the damping coefficient becomes further smaller than the case where the extension speed is in the low-speed range.

Furthermore, upon the contraction of the shock absorber D, the piston 3 moves downward in the cylinder 1 to compress the compression side chamber R2. In the case where the contraction speed of the shock absorber D is in the very low-speed range and approaches zero, the pressure in the compression side chamber R2 rises, but the differential pressure between the extension side chamber R1 and the compression side chamber R2 does not reach the valve opening pressure of the compression side leaf valve 7. Thus, the compression side leaf valve 7 does not open and the compression side port 3d remains closed. The extension side leaf valve 4 is under the pressure in the compression side chamber R2 from the side of its back surface and closes the extension side port 3c. In the case where the contraction speed of the shock absorber D approaches zero, the pressure in the compression side chamber R2 rises but the differential pressure between the extension side chamber R1 and the compression side chamber R2 does not reach the valve opening pressure of the secondary valve 14. Thus, even if the secondary valve 14 bends, its outer circumferential surface faces the range of the axial width of the inner circumference of the annular facing portion 6c, resulting in the valve closing state. This maintains the flow path area of the annular gap P between the secondary valve 14 and the annular facing portion 6c to be extremely small. Besides, during the increase in the contraction speed of the shock absorber D changing from the very low-speed range to the low-speed range, the differential pressure between the pressure in the extension side chamber R1 and the pressure in the compression side chamber R2 exceeds the valve opening pressure of the secondary valve 14. Thus, the secondary valve 14 bends so that its outer circumference deviates upward in FIG. 3 from the range of the axial width of the inner circumference of the annular facing portion 6c. Furthermore, the secondary valve 14 is open, which increases the flow path area of the annular gap P between the secondary valve 14 and the annular facing portion 6c.

Furthermore, the liquid moves from the compression side chamber R2 to the extension side chamber R1 through the annular gap P, the subordinate port 6d, the space C, the extension side port 3c, and the notch orifice 4a. The liquid, when passing through the damping passage DP as described above, passes through the notch orifice 4a and the annular gap P but the flow path area of the annular gap P in the secondary valve 14 in the valve opening state in the very low-speed range becomes smaller than that of the notch orifice 4a. Thus, in the case where the contraction speed of the shock absorber D is in the very low-speed range, the shock absorber D generates a damping force that hinders the contraction mainly due to the resistance offered to the liquid by the secondary valve 14. Thus, in the case where the contraction speed of the shock absorber D is in the very low-speed range, the damping force characteristics on the compression side of the shock absorber D are such that the damping coefficient rises very large at the extension speed near zero and then decreases at the opening of the secondary valve 14, as illustrated in FIG. 4.

In the case where the contraction speed of the shock absorber D goes beyond the very low-speed range and falls in the low-speed range, the pressure in the compression side chamber R2 rises, but the differential pressure between the extension side chamber R1 and the compression side chamber R2 does not reach the first differential pressure that is, the valve opening pressure of the compression side leaf valve 7. Thus, the compression side leaf valve 7 has not yet opened and the compression side port 3d remains closed. The extension side leaf valve 4 is under the pressure in the compression side chamber R2 from the side of its back surface and closes the extension side port 3c. In the case where the contraction speed of the shock absorber D is in the low-speed range, the differential pressure between the pressure in the extension side chamber R1 and the pressure in the compression side chamber R2 exceeds the valve opening pressure of the secondary valve 14. Thus, the secondary valve 14 bends so that its outer circumference deviates upward in FIG. 3 from the range of the axial width of the inner circumference of the annular facing portion 6c. Furthermore, the secondary valve 14 is open, which increases the flow path area of the annular gap P between the secondary valve 14 and the annular facing portion 6c. Thus, in this case as well, the liquid moves from the compression side chamber R2 to the extension side chamber R1 through the annular gap P, the subordinate port 6d, the space C, the extension side port 3c, and the notch orifice 4a, but the flow path area of the annular gap P becomes larger than the flow path area of the notch orifice 4a. Thus, in the case where the contraction speed of the shock absorber D is in the low-speed range, the shock absorber D generates a damping force that hinders the contraction mainly due to the resistance offered to the liquid by the notch orifice 4a. Thus, in the case where the contraction speed of the shock absorber D is in the low-speed range, the damping force characteristics on the compression side of the shock absorber D is proportional to the square of the contraction speed of the shock absorber D, which is peculiar to the orifice, as illustrated in FIG. 4. This is the characteristics in which the damping coefficient becomes smaller than the case where the contraction speed is in the very low-speed range.

Besides, in the case where the contraction speed of the shock absorber D goes beyond the low-speed range and falls in the high-speed range, the differential pressure between the pressure in the extension side chamber R1 and the pressure in the compression side chamber R2 reaches the first differential pressure that is the valve opening pressure of the compression side leaf valve 7, and the compression side leaf valve 7 bends and is open, which opens the compression side port 3d. The extension side leaf valve 4 is under the pressure in the compression side chamber R2 from the side of its back surface and closes the extension side port 3c. In the case where the contraction speed of the shock absorber D is in the high-speed range, the differential pressure between the pressure in the extension side chamber R1 and the pressure in the compression side chamber R2 exceeds the valve opening pressure of the secondary valve 14. Thus, the secondary valve 14 is open, which makes the flow path area of the annular gap P between the secondary valve 14 and the annular facing portion 6c large. The liquid moves from the compression side chamber R2 to the extension side chamber R1 through the annular gap P, the subordinate port 6d, the space C, the compression side port 3d, and between the compression side leaf valve 7 and the compression side valve seat 3f. In the case where the contraction speed of the shock absorber D is in the high-speed range, the flow rate of the liquid moving from the compression side chamber R2 to the extension side chamber R1 increases. Thus, the secondary valve 14 bends significantly, and the flow path area in the gap between the compression side leaf valve 7 and the compression side valve seat 3f becomes smaller than that in the annular gap P. Thus, in the case where the contraction speed of the shock absorber D is in the high-speed range, the shock absorber D generates a damping force that hinders the contraction mainly due to the resistance offered to the liquid by the compression side leaf valve 7. Thus, in the case where the contraction speed of the shock absorber D is in the high-speed range, the damping force characteristics on the compression side of the shock absorber D is proportional to the compression speed of the shock absorber D, which is peculiar to the compression side leaf valve 7, as illustrated in FIG. 4. This is the characteristics in which the damping coefficient becomes further smaller than the case where the contraction speed is in the low-speed range.

Figure 5:
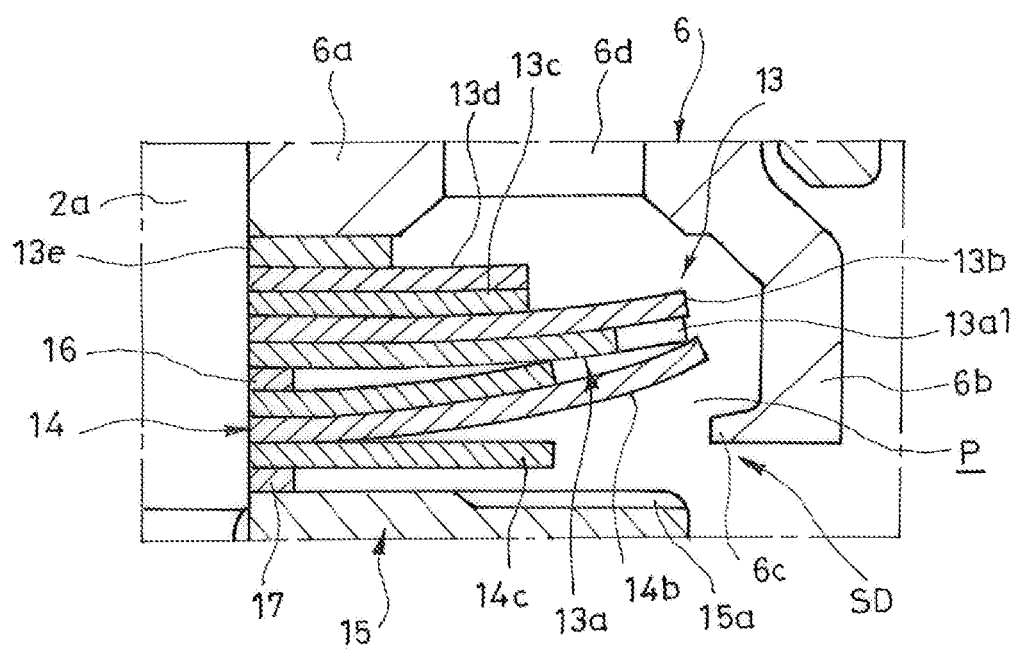
FIG. 5 is a partially enlarged cross-sectional view illustrating a secondary valve of the shock absorber according to the first embodiment of the present invention, with the secondary valve bending together with a valve stopper.

In addition, in the case where the contraction speed of the shock absorber D goes beyond the high-speed range and falls in the very high-speed range, the differential pressure between the pressure in the compression side chamber R2 and the pressure in the extension side chamber R1 reaches the second differential pressure, and the secondary valve 14 bends significantly. Furthermore, the secondary valve 14 comes into contact with the valve stopper 13 and is supported by the valve stopper 13 from its back surface side to hold back the bending. The second differential pressure is larger than the first differential pressure, and the compression side leaf valve 7 is in the valve opening state. Furthermore, if the contraction speed of the shock absorber D reaches the high-speed range and goes higher, the valve stopper 13 bends its outer circumferential side acting as the free end together with the secondary valve 14, as illustrated in FIG. 5, due to its elasticity, which increases the flow path area in the annular gap P between the secondary valve 14 and the annular facing portion 6c. In this way, if the differential pressure between the compression side chamber R2 and the extension side chamber R1 is equal to or higher than the second differential pressure, the deflection amount of bending increases together with the valve stopper 13 as the contraction speed of the shock absorber D increases while the secondary valve 14 is supported by the valve stopper 13 from its back surface side, which increases the flow path area in the annular gap P. In addition, the flexural rigidity of the valve stopper 13 is larger than that of the secondary valve 14, so it is possible for the valve stopper 13 to support the secondary valve 14 to hold back its bending. Besides, the overall flexural rigidity of the valve stopper 13 and the secondary valve 14 in the state of the valve stopper 13 being in contact with the secondary valve 14 is smaller than the flexural rigidity of the compression side leaf valve 7. Thus, in the state where the compression side leaf valve 7 is open and separated from the compression side valve seat 3f to open the compression side port 3d, the flow path area in a gap formed between the compression side leaf valve 7 and the compression side valve seat 3f is set to be in normal cases all the time larger than the flow path area in the annular gap P between the secondary valve 14 and the annular facing portion 6c.

Thus, even if the contraction speed of the shock absorber D reaches the very high-speed range, the secondary valve 14 can increase the deflection amount of bending while being supported by the valve stopper 13, and the flow path area of the secondary damping force generation component SD in the damping passage DP is not limited to the flow path area or less of the compression side leaf valve 7 in the valve opened state. Thus, in the secondary damping force generation component SD, even if the secondary valve 14 is limited to bend due to the support by the valve stopper 13, which does not affect the damping force characteristics of the shock absorber D. In the case where the contraction speed of the shock absorber D is higher than the high-speed range, it is possible to exert the damping force only by the primary damping force generation component MD. Moreover, when the contraction speed of the shock absorber D reaches the very high-speed range and goes higher, the characteristics of the compression side port 3d appear and the damping coefficient increases, as illustrated in FIG. 4. In this case, the shock absorber in the related art that restricts the secondary valve 14 from bending without bending the valve stopper makes the damping force in the very high-speed range higher, as denoted by the alternate long and short dash line in FIG. 4. On the other hand, the damping force of the shock absorber D according to the present embodiment, in which the valve stopper 13 also bends together with the secondary valve 14, decreases in the very high-speed range, as denoted by the solid line.

Moreover, in the case where the annular gap P is set to be substantially zero in the state of the leaf valve 14b facing the inner circumferential surface of the annular facing portion 6c, the differential pressure occurs between the extension side chamber R1 and the compression side chamber R2 immediately upon the start of the shock absorber D to move. Thus, it is possible for the shock absorber D to generate a damping force in a short time in switching its extension and contraction.

The shock absorber D according to the present embodiment operates as described above. In addition, the shock absorber D according to the present embodiment includes the shock absorber main body A, the damping passage DP, the primary damping force generation component MD, and the secondary damping force generation component SD. The shock absorber main body A is extendable and contractable and has the cylinder (outer tube) 1 and the rod 2 that is movably inserted into the cylinder (outer tube) 1. The damping passage DP communicates the extension side chamber R1 with the compression side chamber R2 (two operating chambers), which are provided in the shock absorber main body A. The primary damping force generation component MD and the secondary damping force generation component SD are provided in series with the damping passage DP. The secondary damping force generation component SD includes the secondary valve 14, the annular facing portion 6 c, and the valve stopper 13. The secondary valve 14 has an annular shape provided in the damping passage DP and has the fixed inner circumference acting as a fixed end and the outer circumference acting as a free end to allow the secondary valve 14 to bend. The annular facing portion 6 c faces the free end of the secondary valve 14 with the annular gap P therebetween. The valve stopper 13 has an elastic annular shape and faces the secondary valve 14 in the axial direction with a gap therebetween. The valve stopper 13 restricts the secondary valve 14 from further bending when the secondary valve 14 bends and comes into contact with the valve stopper 13. The valve stopper 13 has the inner circumference acting as a fixed end and the outer circumference opposite to the inner circumference, allowing the outer circumference acting as a free end to bend.

In the shock absorber D configured as described above, when the secondary valve 14 comes into contact with the valve stopper 13, the secondary valve 14 that tries to bend due to the pressure received from the front surface side is supported by the valve stopper 13 having elasticity on the back surface side. The valve stopper 13 also bends together with the secondary valve 14 as the contraction speed increases. Thus, in a situation where the compression side leaf valve (primary valve) 7 is open, it is possible to increase the annular gap P between the secondary valve 14 and the annular facing portion 6c depending on the contraction speed of the shock absorber D while reducing the stress of the secondary valve 14 by being supported by the valve stopper 13. Accordingly, the damping force generated in the shock absorber D can be prevented from being excessive.

The shock absorber D according to the present embodiment having such a configuration makes it possible to prevent the damping force to be generated from being excessive, resulting in the improved ride quality of the vehicle. Furthermore, in the case where the secondary valve 14 bends and comes into contact with the valve stopper 13 with elasticity, the valve stopper 13 bends together with the secondary valve 14 and enables the annular gap P to be larger depending on the contraction speed of the shock absorber D, but does not limit the flow path area to a small value. Thus, even if the shock absorber D is the single-cylinder type, it is possible to prevent the damping force on the compression side from reaching the upper limit immediately to keep the extension side chamber R1 from being negative pressure. This enables the damping force to exert in a short time upon switching the extension and contraction speed of the shock absorber D into the extension mode, which makes it possible to prevent abnormal noise from occurring. Thus, the shock absorber D according to the present embodiment makes it is possible to improve the ride quality in the vehicle and reduce or eliminate the occurrence of abnormal noise. Moreover, the shock absorber D according to the present embodiment sets the flow path area of the annular gap P between the secondary valve 14 and the annular facing portion 6 c to be all the time larger than that of the gap formed between the compression side leaf valve (primary valve) 7 and the compression side valve seat 3 f in the state in which the compression side leaf valve (primary valve) 7 is open. However, the shock absorber D according to the present embodiment can have a configuration where the secondary valve 14 bends together with the valve stopper 13 upon coming into contact with valve stopper 13. Specifically, in the case where the contraction speed of the shock absorber D exceeds the very high-speed range, even if the flow path area of the annular gap P is smaller than that of the gap formed between the compression side leaf valve (primary valve) 7 and the compression side valve seat 3 f, it is possible to hold back the excessive damping force of the shock absorber D to reduce or eliminate the occurrence of abnormal noise, as compared with the shock absorber in the related art.

Moreover, the shapes of the secondary valve 14 and the annular facing portion 6c, when viewed from the axial direction, can be changed in design, and can have optional shapes as long as they can offer resistance against the flow of the liquid passing between the secondary valve 14 and the annular facing portion 6c. Examples thereof include elliptical, D-shape, cross shape, annulus shape with some or more cutouts, square shape, or the like in addition to an annular shape.

Further, the shape of the valve stopper 13, when viewed from the axial direction, is not limited to the annulus shape as long as the valve stopper 13 can bend itself while restricting the bending of the secondary valve 14 when coming into contact with the secondary valve 14. The shape can be changed in design, and examples thereof include elliptical, C-shape, D-shape, cross shape, annulus shape with some or more cutouts, square shape, or the like in addition to an annular shape.

Further, the shock absorber D according to the present embodiment as described above sets the speed range in which the damping force is mainly generated by the secondary valve 14 to the very low-speed range, sets the speed range in which the damping force is mainly generated by the notch orifice 4a to the low-speed range, and sets the speed range in which the damping force is mainly generated by the extension side leaf valve 4 and the compression side leaf valve 7 to the high-speed range. Moreover, the speed for classifying the very low speed, the low speed, and the high speed can be set optionally by the designer.

Further, in the shock absorber D according to the present embodiment, the flexural rigidity of the valve stopper 13 higher than that of the secondary valve 14 makes it possible to hold back the secondary valve 14 from excessive bending, resulting in the effective decrease in the stress of the secondary valve 14. Moreover, the structure in which the valve stopper 13 and the secondary valve 14 come into contact with each other and bend together is equivalent to the structure in which the springs are arranged in parallel. Thus, even if the flexural rigidity of the valve stopper 13 is lower than that of the secondary valve 14, the overall flexural rigidity of the secondary valve 14 and the valve stopper 13 in contact with each other increases, which makes it possible to reduce the deflection amount of bending of the secondary valve 14 being supported by the valve stopper 13. Thus, even if the flexural rigidity of the valve stopper 13 is lower than that of the secondary valve 14, the effects of the present invention can be achieved as they are.

Besides, the shock absorber D according to the present embodiment has the compression side leaf valve (primary valve) 7 in which the primary damping force generation component MD opens or closes the damping passage DP. In the state in which the secondary valve 14 is in contact with the valve stopper 13, the flow path area of the compression side leaf valve (primary valve) 7 in the valve opening state is set to be all the time wider than the flow path area in the annular gap P between the secondary valve 14 and the annular facing portion 6 c. In the shock absorber D configured in this way, when the compression side leaf valve (primary valve) 7 is open, the secondary valve 14 and the annular facing portion 6 c do not limit the flow path area of the damping passage DP beyond the compression side leaf valve (primary valve) 7. Thus, it is possible to exert the damping force only by the primary damping force generation component MD in the case where the contraction speed of the shock absorber D is in the high-speed range or more speed range. Thus, the shock absorber D according to the present embodiment makes it possible to achieve effective improvement of the vehicle ride quality, making no damping force excessive even if the contraction speed reaches the very high-speed range. Thus, it is possible to set the damping force characteristics in the speed range equal to or higher than the high-speed range in a relatively simple manner.

Further, the shock absorber D according to the present embodiment has the compression side leaf valve (primary valve) 7 in which the primary damping force generation component MD opens when the differential pressure between the extension side chamber R1 and the compression side chamber R2 reaches the first differential pressure. The secondary valve 14 comes into contact with the valve stopper 13 when the differential pressure between the extension side chamber R1 and the compression side chamber R2 reaches the second differential pressure equal to or higher than the first differential pressure. In the shock absorber D configured in this way, the contraction speed of the shock absorber D goes high and the compression side leaf valve (primary valve) 7 is open, and when the contraction speed goes further higher, the secondary valve 14 comes into contact with the valve stopper 13. In other words, the timing at which the secondary valve 14 comes into contact with the valve stopper 13 is after the compression side leaf valve (primary valve) 7 is open. Therefore, according to the shock absorber D configured in this way, in the situation where the compression side leaf valve (primary valve) 7 is open, the secondary valve 14 and the annular facing portion 6c prevent limiting the flow path area of the damping passage DP beyond the compression side leaf valve (primary valve) 7. Thus, it is possible to exert the damping force only by the primary damping force generation component MD in the case where the contraction speed of the shock absorber D is in the high-speed range or more speed range. Thus, the shock absorber D according to the present embodiment makes it possible to achieve effective improvement of the vehicle ride quality, making no damping force excessive even if the contraction speed reaches the very high-speed range. Thus, it is possible to set the damping force characteristics in the speed range equal to or higher than the high-speed range in a relatively simple manner. Moreover, the first differential pressure at which the compression side leaf valve 7 opens and the second differential pressure at which the secondary valve 14 comes in contact with the valve stopper 13 can be optionally set by the designer as long as the condition that the second differential pressure is equal to or higher than the first differential pressure is satisfied.

Further, in the shock absorber D according to the present embodiment, the valve stopper 13 is formed by stacking the plurality of annular plates 13a, 13b, 13c, 13d, and 13e. The shock absorber D configured as described above makes it possible to adjust the flexural rigidity of the valve stopper 13 with ease by means of the number of stacked annular plates. Thus, the shock absorber D configured in this way makes it possible to tune the deflection amount of bending after the secondary valve 14 comes into contact with the valve stopper 13 with ease, resulting in the effectively reduced stress of the secondary valve 14 and the prevention of the damping force from being excessive. However, the valve stopper 13 has elasticity and has a higher flexural rigidity than the secondary valve 14. If the valve stopper 13 can bend together with the secondary valve 14 while supporting the back surface of the secondary valve 14 when it comes into contact with the secondary valve 14, the valve stopper 13 can be formed as a single annular plate or can have other shapes than the annular shape when viewed from the axial direction.

Besides, in the shock absorber D according to the present embodiment, the valve stopper 13 is formed by stacking a plurality of annular plates 13a, 13b, 13c, 13d, and 13e. The two annular plates 13a and 13b on the side of the secondary valve 14 have the outer diameters equal to the outer diameter of the leaf valve 14b having the largest outer diameter of the secondary valves 14. The two annular plates 13c and 13d stacked on the opposite side of the annular plates 13a and 13b with respect to the secondary valve have the outer diameters smaller than the outer diameters of the annular plates 13a and 13b. In addition, the annular plate 13e stacked on the opposite side of the annular plate 13d with respect to the secondary valve has the outer diameter further smaller than the outer diameter of the annular plate 13d. In this way, the diameter of the valve stopper 13 on the free end side gradually varies from the secondary valve side toward the opposite side of the secondary valve to approximate the diameter on the fixed end side. In other words, the outer diameter of the valve stopper 13 is gradually reduced toward the opposite side of the secondary valve. According to the shock absorber D configured in this way, the outer diameter of the valve stopper 13 on the opposite side of the secondary valve gradually decreases as the distance from the secondary valve 14 increases. Thus, even if the secondary valve 14 comes into contact with the valve stopper 13 and bends upward as illustrated in FIG. 5 together with the valve stopper 13, the flow path area at the opening of the subordinate port 6d of the fitting portion 6a of the secondary valve case 6 is not reduced to an unusable level. Thus, according to the shock absorber D configured in this way, the restriction of the flow path area of the damping passage DP due to the progress of the bending of the valve stopper 13 does not occur by the valve stopper 13 itself. Thus, no problem of the excessive damping force when the contraction speed is in the high-speed range occurs by the valve stopper 13.

Figure 6:
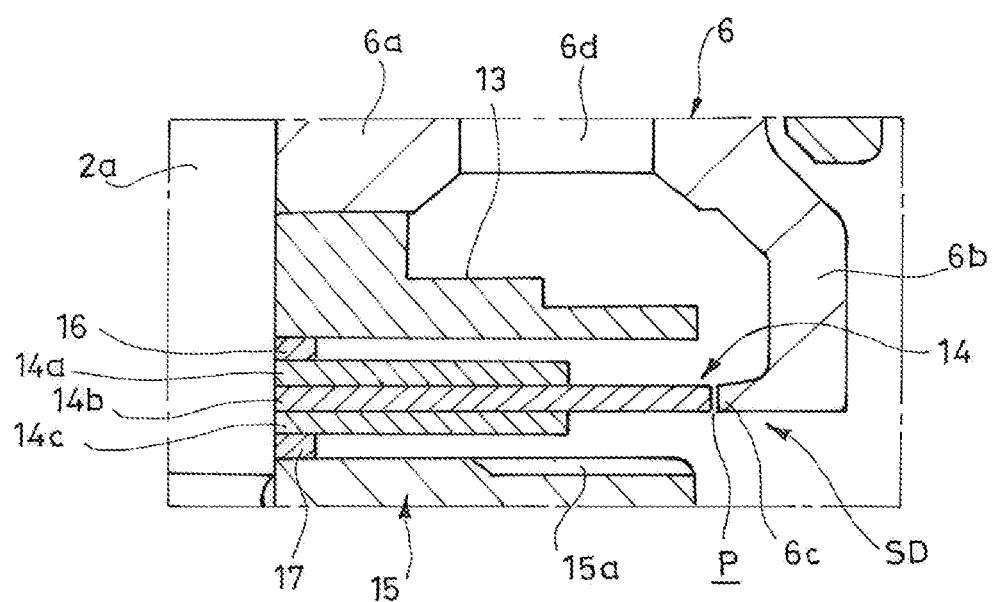
FIG. 6 is a partially enlarged cross-sectional view of a secondary damping force generation component of a shock absorber according to a first modification of the first embodiment of the present invention.

Further, in the shock absorber D according to the present embodiment, the valve stopper 13 is formed by stacking annular plates having different diameters, and its outer diameter gradually decreases toward the opposite side of the secondary valve. However, the outer diameter can be formed as a single annular plate having a shape that gradually decreases toward the opposite side of the secondary valve as illustrated in FIG. 6. In addition, in a case where the valve stopper 13 is formed as a single annular plate, its outer diameter can have a shape that gradually decreases toward the opposite side of the secondary valve in a step-less manner. In this case as well, the flow path area at the opening of the subordinate port 6d of the fitting portion 6a of the secondary valve case 6 is not reduced to an unusable level. Thus, according to the shock absorber D configured in this way as well, the restriction of the flow path area of the damping passage DP due to the progress of the bending of the valve stopper 13 does not occur by the valve stopper 13 itself. Thus, no problem of the excessive damping force when the contraction speed is in the high-speed range occurs by the valve stopper 13.

Moreover, in the present embodiment, the secondary valve 14 has the fixed inner circumference and the bendable outer circumference, and faces the annular facing portion 6c of the outer circumference. The valve stopper 13 has the inner circumference made as a fixed end and the bendable outer circumference made as a free end. However, the secondary valve and the valve stopper can have outer circumferences made as a fixed end and inner circumferences made as a free end for allowing the inner circumferences to bend, with the inner circumference of the secondary valve facing the annular facing portion.

Figure 7:
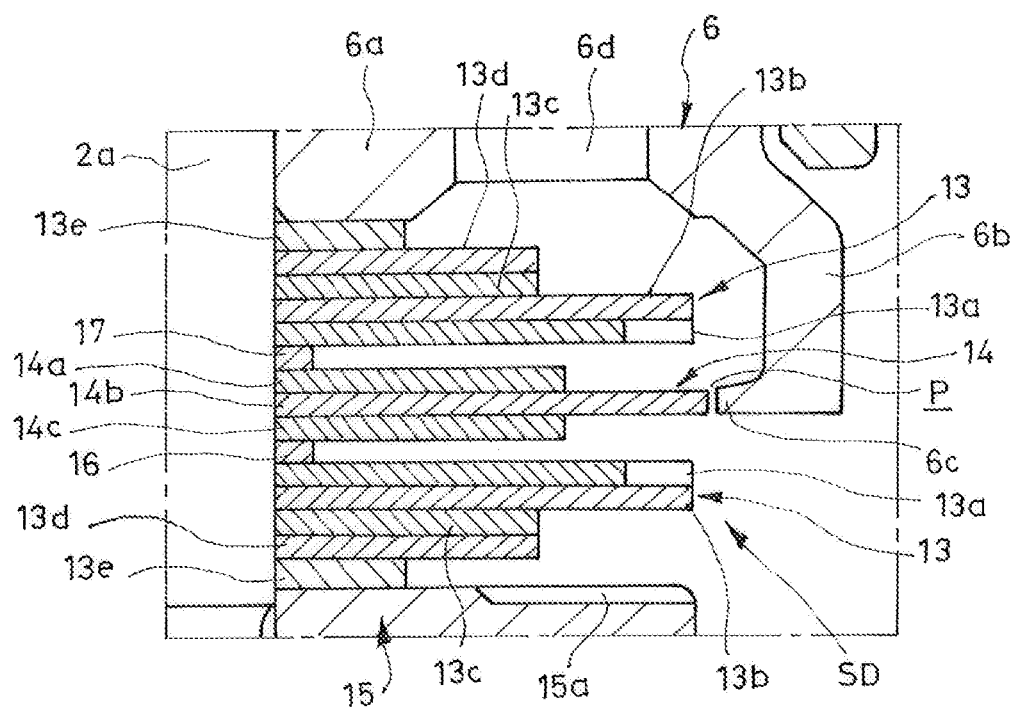
FIG. 7 is a partially enlarged cross-sectional view of a secondary damping force generation component of a shock absorber according to a second modification of the first embodiment of the present invention.

Further, even when the shock absorber D extends in the very high-speed range, there can be a case where the flow path area of the annular gap P between the secondary valve 14 and the annular facing portion 6c is intended to increase while holding back the secondary valve 14 from bending. This can be obtained by placing the valve stopper 13 having the structure illustrated in FIG. 2 below the secondary valve 14, with the valve stopper 13 turned upside down and interposed between the nut and the secondary valve 14 as illustrated in FIG. 7, rather than using the piston nut 15 as a valve stopper for the secondary valve 14. In this case, after the extension speed of the shock absorber D reaches the high-speed range and the extension side leaf valve 4 opens, there can be a case where the differential pressure between the pressure in the extension side chamber R1 and the pressure in the compression side chamber R2 becomes equal to or higher than the second differential pressure. In this case, the secondary valve 14 comes into contact with the valve stopper 13, and the valve stopper 13 supports the secondary valve 14, so it is possible to increase the flow path area of the annular gap P depending on the increase in the extension speed. Thus, in the shock absorber illustrated in FIG. 7, the extension side port 3c forms a part of the damping passage DP together with the compression side port 3d, and the extension side leaf valve 4 also forms the primary valve in the primary damping force generation component MD together with the compression side leaf valve 7. In the shock absorber D configured in this way, not only during the contraction operation but also during the extension operation, it is possible to prevent the damping force when the extension and contraction speed goes to the very high-speed range or higher range from being excessive in the opening state of the extension side leaf valve 4 or the compression side leaf valve 7.

Furthermore, in the shock absorber D according to the present embodiment, the secondary damping force generation component SD has the inner circumference and the outer circumference, one of which is a fixed end and the other is a free end for bending. The secondary damping force generation component SD includes the secondary valve 14 provided in the damping passage DP and the annular facing portion 6c facing the secondary valve 14 with an annular gap P spaced between the free end of the secondary valve 14 and the annular facing portion 6c. According to the shock absorber D configured in this way, it is possible to exert the damping force by narrowing the damping passage DP using the annular gap P in the state where the secondary valve 14 does not bend, generating the damping force when the extension and contraction speed is in the extremely low-speed range. In addition, the opening area of the annular gap P is adjustable depending on the size of the outer diameter of the secondary valve 14, thus it is possible to adjust the damping force characteristics with ease by replacing the secondary valves 14 having different outer diameters.

Figure 8:
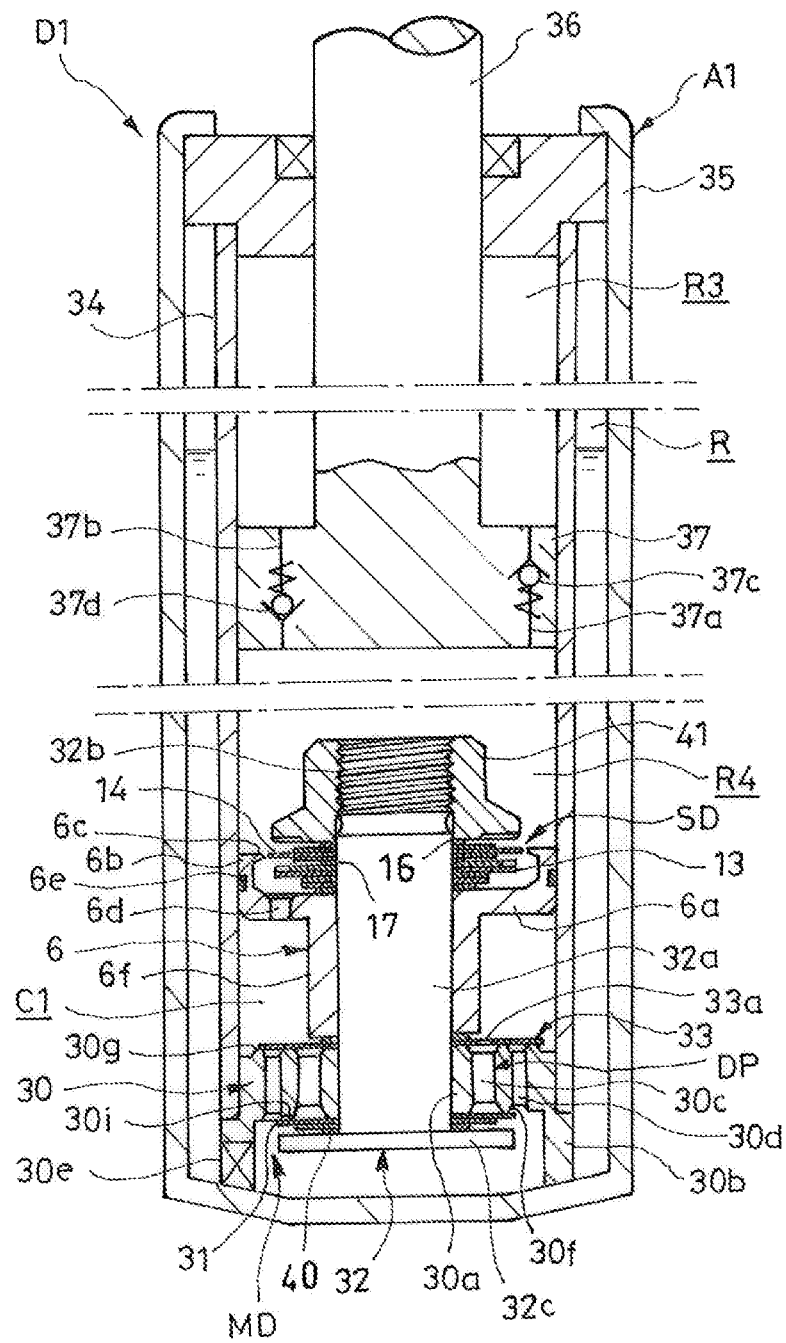
FIG. 8 is a longitudinal cross-sectional view of a shock absorber of a second modification of a second embodiment of the present invention.
Figure 9:
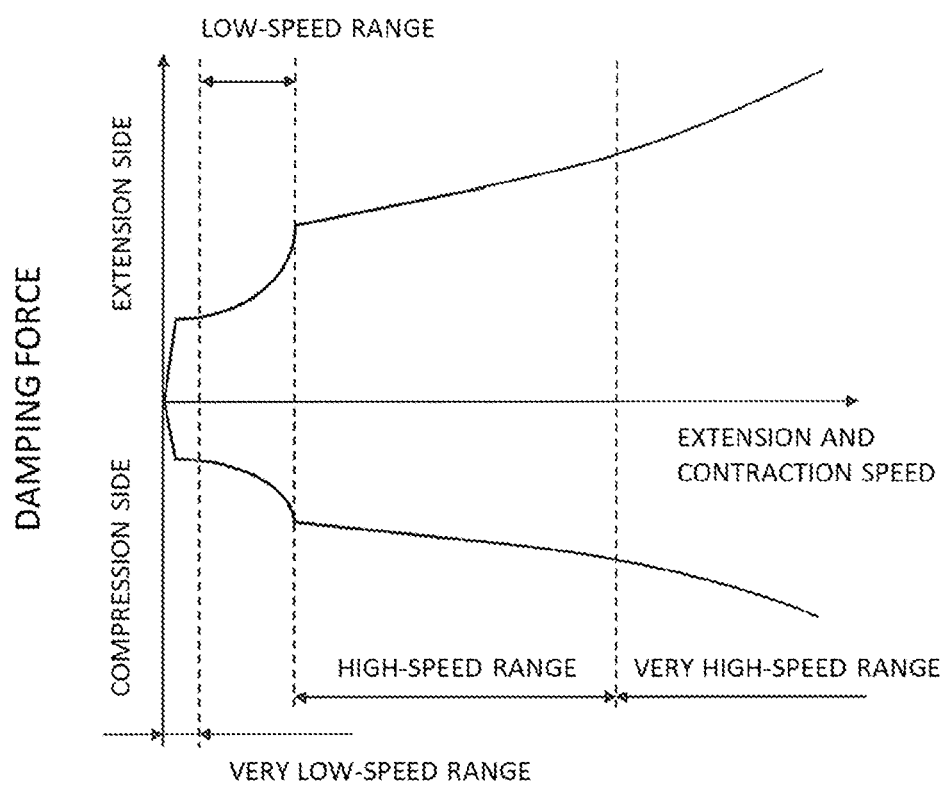
FIG. 9 is a diagram illustrating the damping force characteristics of a shock absorber in the related art.

Further, FIG. 1 is a diagram illustrating the two operating chambers set as the extension side chamber R1 and the compression side chamber R2. However, two operating chambers can be a compression side chamber R4 and a reservoir R in a case where a shock absorber D1 according to a second embodiment illustrated in FIG. 8 is a multi-cylinder shock absorber. The shock absorber D1 according to the second embodiment includes a primary damping force generation component MD and a secondary damping force generation component SD. The primary damping force generation component MD includes a valve case 30 and a primary valve 31. The valve case 30 comparts the compression side chamber R4 and the reservoir R and has a discharge port 30c that communicates the compression side chamber R4 with the reservoir R. The primary valve 31 opens or closes the discharge port 30c. The secondary damping force generation component SD includes a secondary valve case 6, a secondary valve 14, and a valve stopper 13. The secondary valve case 6 forms a damping passage DP together with the discharge port 30c.

The shock absorber D1 includes a shock absorber main body A1, a piston 37, the damping passage DP, the primary damping force generation component MD, and the secondary damping force generation component SD. The shock absorber main body A1 is provided with a cylinder 34, an outer tube 35, and a rod 36. The outer tube 35 has a bottomed cylindrical shape that covers the outer circumference of the cylinder 34. The reservoir R is formed between the outer tube 35 and the cylinder 34. The rod 36 movably inserts into the cylinder 34. The piston 37 is connected to the rod 36, is movably inserted into the cylinder 34, and divides the inside of the cylinder 34 into an extension side chamber R3 and the compression side chamber R4. The damping passage DP communicates the compression side chamber R4 with the reservoir R, which are used as two operating chambers provided in the shock absorber main body A1. The primary damping force generation component MD and the secondary damping force generation component SD are provided in series with the damping passage DP.

The upper ends of the cylinder 34 and the outer tube 35 are closed by a rod guide, which has an annular shape (not illustrated) and has an inner circumference into which the rod 36 is inserted, so the cylinder 34 and the outer tube 35 are closed spaces inside.

The piston 37 divides the inside of the cylinder 34 into the extension side chamber R3 and the compression side chamber R4, which are filled with liquid. The piston 37 is provided with passages 37a and 37b, a damping valve 37c, and a damping valve 37d. The passages 37a and 37b communicate the extension side chamber R3 with the compression side chamber R4. The damping valve 37c is provided in partway in the passage 37a to allow only the flow of liquid from the extension side chamber R3 to the compression side chamber R4 and offers resistance against the flow of liquid. The damping valve 37d is provided partway in the passage 37b to allow only the flow of liquid from the compression side chamber R4 to the extension side chamber R3 and offers resistance against the flow of liquid.

The primary damping force generation component MD includes the valve case 30 and the primary valve 31. The valve case 30 is fitted to the lower end of the cylinder 34 in FIG. 8 and is sandwiched between the cylinder 34 and the bottom of the outer tube 35. The valve case 30 comparts the outer tube 35 to define the reservoir R and the compression side chamber R4. The primary valve 31 opens and closes the discharge port 30c provided in the valve case 30. Moreover, the valve case 30 and the primary valve 31 are both annular and have inner circumferential sides into which a guide rod 32 is inserted. Furthermore, the primary valve 31 is mounted on the outer circumference of the guide rod 32 so that the inner circumferential side is made as a fixed end, and the outer circumferential side is made as a free end for allowing the outer circumferential side to bend.

The valve case 30 is fitted to the lower end of the cylinder 34 and comparts the outer tube 35 into the compression side chamber R4 and the reservoir R. The reservoir R is formed between the cylinder 34 and the outer tube 35. In the shock absorber D1 according to the present embodiment in this way, the compression side chamber R4 and the reservoir R in the outer tube 35 are used as the operating chambers.

Specifically, the valve case 30 is annular and includes a main body portion 30a that is fitted to the lower end of the cylinder 34 in FIG. 8, a leg portion 30b that is annular and extends downward from the outer circumference of the lower end of the main body portion 30a, the discharge port 30c that is provided on the same circumference of the main body portion 30a and penetrates the main body portion 30a in the axial direction, a suction port 30d is provided on the same circumference of main body portion 30a that is more outside than the discharge port 30c and penetrates the main body portion 30a in the axial direction, and the discharge port 30c that is provided in the lower end of the main body portion 30a in FIG. 8. Furthermore, in the present embodiment, the discharge port 30c provided in the valve case 30 communicates the compression side chamber R4 used as the operating chamber with the reservoir R used as the operating chamber. In addition, the valve case 30 is provided with a notch 30e in the leg portion 30b. The notch 30e communicates an annular gap between the cylinder 34 and the outer tube 35 with the inside of the leg portion 30b and prevents the damping passage DP from interfering the communication between the compression side chamber R4 and the reservoir R.

Further, the guide rod 32 is inserted through the inner circumference of the valve case 30. The guide rod 32 includes a shaft portion 32a, a screw portion 32b, and a flange portion 32c. The shaft portion 32a is cylindrical and is inserted into the valve case 30. The screw portion 32b is provided on the outer circumference of the tip of the shaft portion 32a. The flange portion 32c is provided on the outer circumference of the base end of the shaft portion 32a.

The primary valve 31 made of an annular stacked leaf valve is superimposed at the lower end of the valve case 30 in FIG. 8 and opens or closes the discharge port 30c. On the upper end of the valve case 30 in FIG. 8, a check valve 33 is superimposed. The check valve 33 is annular and opens or closes the suction port 30d. The primary valve 31, the valve case 30, and the check valve 33 are sequentially assembled to the outer circumference of the shaft portion 32a of the guide rod 32 together with the secondary valve case 6, the valve stopper 13, the secondary valve 14, and the spacers 16 and 17 arranged above and below the secondary valve 14. The secondary valve case 6, the valve stopper 13, the secondary valve 14 constitute the secondary damping force generation component SD. In addition, the primary valve 31, the valve case 30, and the check valve 33 are sandwiched between a nut 41 screwed to the screw portion 32b and the flange portion 32c and are fixed to the guide rod 32.

The primary valve 31 is a stacked leaf valve configured by stacking a plurality of annular plates and has the inner circumference fixed to the guide rod 32 as described above. The primary valve 31 is stacked at the lower end of the valve case 30 in FIG. 8, is provided at the lower end of the valve case 30 in FIG. 8, and is seated on a valve seat 30f that surrounds the discharge port 30c. Moreover, the valve seat 30f is provided with an orifice 30i formed by stamping or notching. The primary valve 31 communicates the discharge port 30c with the reservoir R only by the orifice 30i provided on the valve seat 30f, with the primary valve 31 being seated on the valve seat 30f. Moreover, the primary valve 31, even when being seated on the valve seat 30f, does not block the inlet of the suction port 30d. Furthermore, the differential pressure between the compression side chamber R4 acting on the front surface side and the reservoir R acting on the back surface side through the discharge port 30c can reach the first differential pressure that is the valve opening pressure. In this case, the primary valve 31 bends its outer circumference to open the discharge port 30c apart from the valve seat 30f, forming a gap between the primary valve 31 and the valve seat 30f. This allows the discharge port 30c to communicate with the reservoir R through the gap and the resistance to be offered to the flow of liquid passing through the gap. In the shock absorber D1 according to the present embodiment, the primary valve 31 opens when the contraction speed of the shock absorber D is in the high-speed range, which offers the resistance against the flow of liquid from the compression side chamber R4 to the reservoir R through the discharge port 30c. In addition, the primary valve 31 sets the discharge port 30c as a one-way passage that allows only the flow of liquid from the compression side chamber R4 to the reservoir R. As described above, the primary damping force generation component MD in the shock absorber D1 of the present embodiment is constituted by the valve case 30 and the primary valve 31 that opens and closes the discharge port 30c provided in the valve case 30.

Moreover, it is possible to adjust the setting of the first differential pressure that is the valve opening pressure of the primary valve 31 using the flexural rigidity and the initial deflection amount of bending of the primary valve 31, which is similar to the shock absorber D. In addition, it is possible to adjust the position of the bending fulcrum by changing the outer diameter of a spacer 40 stacked on the back surface side of the primary valve 31. In addition, a valve stopper for regulating the maximum deflection amount of bending of the primary valve 31 can be provided, or the flange portion 32c of the guide rod 32 can be used as a stopper for regulating the bending of the primary valve 31.

Further, the check valve 33 includes an annular plate and has the inner circumference fixed to the guide rod 32 as described above. The check valve 33 is stacked on the upper surface of the valve case 30 in FIG. 8 and is seated on a valve seat 30g, which is provided at the upper end of the valve case 30 in FIG. 8 and surrounds the suction port 30d. The check valve 33 closes only the suction port 30d surrounded by the valve seat 30g in the state being seated on the valve seat 30g. Moreover, the check valve 33 is provided with a throughhole 33a at a position facing the discharge port 30c and does not block the discharge port 30c even when coming into contact with the upper surface of the valve case 30 in FIG. 8. Furthermore, when the pressure in the compression side chamber R4 is lower than the pressure in the reservoir R, the check valve 33 bends to open the suction port 30d and allows the flow of liquid moving from the reservoir R to the compression side chamber R4 through the discharge port 30c. In this way, the check valve 33 sets the suction port 30d as a one-way passage that allows only the flow of liquid from the reservoir R to the compression side chamber R4.

In the secondary damping force generation component SD, the secondary valve case 6 is stacked above the check valve 33 in FIG. 8 and is mounted on the outer circumference of the guide rod 32. In the shock absorber D according to the first embodiment described above, the secondary valve case 6 fits the fitting portion 6a into the inner circumference of the cylindrical portion 3b of the piston 3. However, in the shock absorber D1 according to the second embodiment, the outer diameter of the fitting portion 6a increases so that the outer circumference of the fitting portion 6a is fitted to the inner circumference of the cylinder 34, and the outer circumference of the fitting portion 6a is provided with a seal ring 6e for sealing between the fitting portion 6a and the cylinder 34. In addition, in the shock absorber D1 according to the second embodiment, the secondary valve case 6 forms a gap between the lower end of the fitting portion 6a and the check valve 33 to allow the check valve 33 to bend, so the secondary valve case 6 is provided with a cylindrical boss portion 6f that protrudes from the inner circumference of the fitting portion 6a toward the check valve. Moreover, the other structure of the secondary valve case 6 in the shock absorber D1 according to the second embodiment is similar to that of the secondary valve case 6 in the shock absorber D according to the first embodiment.

Thus, when the secondary valve case 6 is fixed to the guide rod 32 together with the valve case 30, the subordinate port 6d of the secondary valve case 6 is communicated with the discharge port 30c of the valve case 30 through a space C1 between the secondary valve case 6 and the valve case 30. As described above, in the shock absorber D1 according to the present embodiment, the damping passage DP includes the subordinate port 6d, the space C1, and the discharge port 30c and forms a passage that communicates the compression side chamber R4 with the reservoir R.

The secondary valve 14 and the valve stopper 13 are similar in configuration to the shock absorber D of the first embodiment. Thus, when the secondary damping force generation component SD is assembled to the outer circumference of the guide rod 32, the secondary valve 14 faces the annular facing portion 6c provided in the secondary valve case 6 with the annular gap P therebetween. The secondary valve 14 and the valve stopper 13 both have inner circumferences mounted on the outer circumference of the guide rod 32 and are allowed to bend by using the inner circumference side as a fixed end and the outer circumference side as a free end. Thus, even in the shock absorber D1, the compression side chamber R4 and the reservoir R as two operating chambers are communicated with each other by the damping passage DP, and the primary damping force generation component MD and the secondary damping force generation component SD are provided in series with the damping passage DP. Furthermore, the first differential pressure, which is the valve opening pressure of the primary valve 31, is set to be larger than the valve opening pressure of the secondary valve 14.

Furthermore, the opening area of the annular gap P in the state where the secondary valve 14 does not bend is smaller than that of the orifice 30i described above. In the case where the contraction speed of the shock absorber D1 is in the low-speed range or the high-speed range, the secondary valve 14 bends, which makes the opening area of the annular gap P larger than that of the orifice 30i. The valve opening pressure of the secondary valve 14 is lower than the first differential pressure which is the valve opening pressure of the primary valve 31. In the case where the contraction speed of the shock absorber D1 is in the low-speed range, the secondary valve 14 opens as described above, but the primary valve 31 does not open and the liquid moves from the compression side chamber R4 to the reservoir R through the orifice 30i.

Upon the extension of the shock absorber D1 configured in this way, the piston 37 moves upward in the cylinder 34 to compress the extension side chamber R3. The liquid moves from the extension side chamber R3 to the expanding compression side chamber R4 through the passage 37a and the damping valve 37c of the piston 37. The retraction of the rod 36 from the cylinder 34 makes the liquid lack in the cylinder 34 by the volume of liquid that the rod 36 retracts from the cylinder 34, but the shortage liquid is supplied from the reservoir R to the compression side chamber R4 through the suction port 30d by opening the check valve 33. Thus, in the shock absorber D1, upon the extension of the shock absorber, the damping valve 37c generates a damping force that hinders the extension.

On the other hand, upon the contraction of the shock absorber D1, the piston 37 moves downward in the cylinder 34 to compress the compression side chamber R4. The liquid moves from the compression side chamber R4 being compressed to the extension side chamber R3 being expanded through the passage 37b and the damping valve 37d of the piston 37. Upon the contraction of the shock absorber D1, the rod 36 advances into the cylinder 34, so the volume of the liquid in which the rod 36 advances into the cylinder 34 becomes excess liquid in the cylinder 34, and the excess liquid moves to the reservoir R through the damping passage DP. In the case where the contraction speed of the shock absorber D1 is in the very low-speed range, the pressure in the compression side chamber R4 rises, but the differential pressure between the pressure in the compression side chamber R4 and the pressure in the reservoir R does not reach the first differential pressure that is the valve opening pressure of the primary valve 31. Thus, the liquid moves from the compression side chamber R4 to the reservoir R through the annular gap P, the subordinate port 6d, the space C1, the discharge port 30c, and the orifice 30i. On the other hand, in the case where the contraction speed of the shock absorber D1 is in the very low-speed range, the differential pressure between the pressure in the compression side chamber R4 and the pressure in the reservoir R does not reach the valve opening pressure of the secondary valve 14. Even in the shock absorber D1 according to the second embodiment, the flow path area in the annular gap P between the secondary valve 14 and the annular facing portion 6c at the time of valve closure is set to be smaller than the flow path area of the orifice 30i. Thus, in the case where the contraction speed of the shock absorber D1 is in the very low-speed range, the shock absorber D1 generates a damping force mainly by the resistance offered to the liquid by the secondary valve 14 and the damping valve 37d. Thus, in the case where the contraction speed of the shock absorber D1 is in the very low-speed range, the damping force characteristics on the compression side of the shock absorber D1 have a considerably large damping coefficient and are characteristics that rise significantly with respect to the increase in the contraction speed.

In the case where the contraction speed of the shock absorber D1 is in the low-speed range beyond the very low-speed range, the pressure in the compression side chamber R4 rises, but the differential pressure between the pressure in the compression side chamber R4 and the pressure in the reservoir R does not reach the first differential pressure that is the valve opening pressure of the primary valve 31. Thus, the primary valve 31 has not yet opened and remains seated on the valve seat 30f. In the case where the contraction speed of the shock absorber D1 is in the low-speed range, the differential pressure between the pressure in the compression side chamber R4 and the pressure in the reservoir R exceeds the valve opening pressure of the secondary valve 14, then the secondary valve 14 bends and opens the annular gap P, which makes the flow path area of the annular gap P increases. The flow path area of the annular gap P in the secondary valve 14 in the valve opening state becomes larger than the flow path area of the orifice 30i. Thus, in the case where the contraction speed of the shock absorber D1 is in the low-speed range, the shock absorber D1 generates a damping force mainly by the resistance offered to the liquid by the orifice 30i and the damping valve 37d. Thus, in the case where the contraction speed of the shock absorber D1 is in the low-speed range, the damping force characteristics on the compression side of the shock absorber D1 is proportional to the square of the contraction speed of the shock absorber D1, which is peculiar to the orifice. This is the characteristics in which the slope (damping coefficient) becomes smaller than the case where the contraction speed is in the very low-speed range.

Besides, in the case where the contraction speed of the shock absorber D1 goes beyond the low-speed range and falls in the high-speed range, the differential pressure between the pressure in the compression side chamber R4 and the pressure in the reservoir R reaches the first differential pressure that is the valve opening pressure of the primary valve 31, and the primary valve 31 bends and is open, which opens the discharge port 30c. In the case where the contraction speed of the shock absorber D1 is in the high-speed range, the secondary valve 14 also bends significantly and is open, which makes the flow path area of the annular gap P larger than the flow path area of the gap between the primary valve 31 and the valve seat 30f. Thus, in the case where the extension speed of the shock absorber D1 is in the high-speed range, the shock absorber D1 generates a damping force mainly by the resistance offered to the liquid by the primary valve 31 and the damping valve 37d. Thus, in the case where the contraction speed of the shock absorber D1 is in the high-speed range, the damping force characteristics on the compression side of the shock absorber D1 is proportional to the compression speed of the shock absorber D1, which is peculiar to the primary valve 31. This is the characteristics in which the damping coefficient becomes smaller than the case where the contraction speed is in the low-speed range.

Furthermore, in the case where the contraction speed of the shock absorber D1 reaches the very high-speed range beyond the high-speed range, the differential pressure between the pressure in the compression side chamber R4 and the pressure in the reservoir R reaches the second differential pressure and the secondary valve 14 comes into contact with the valve stopper 13. If the contraction speed further increases, the valve stopper 13 supports the back surface of the secondary valve 14 that bends to the front surface side under pressure in the compression side chamber R4 and bends downward in FIG. 8 together with the secondary valve 14 as the contraction speed increases. In the shock absorber D1 as well, the bending of the secondary valve 14 is not completely regulated by the valve stopper 13, and the valve stopper 13 having elasticity bends together with the secondary valve 14 while supporting the secondary valve 14. Even if the contraction speed of the shock absorber D1 reaches the very high-speed range beyond the high-speed range and the secondary valve 14 comes into contact with the valve stopper 13, it is possible to secure a large flow path area of the annular gap P. Thus, it is possible for the shock absorber D1 configured in this way to reduce the stress of the secondary valve 14 and preventing the flow path area of the annular gap P from being a bottleneck in the damping passage DP. In addition, even in the case where the contraction speed reaches the very high-speed range beyond the high-speed range, it is possible for the shock absorber D1 to generate the damping force by the primary valve 31 in the primary damping force generation component MD, preventing the damping force from being an excessive level.

Moreover, a check valve can be provided in the passage 37b to allow only the flow of liquid from the compression side chamber R4 to the extension side chamber R3, instead of the damping valve 37d. The check valve does not contribute to the damping force of the shock absorber D1 because it offers little resistance against the flow of liquid. Thus, in the case where the check valve is provided instead of the damping valve 37d, the shock absorber D1 generates a damping force mainly by the secondary valve 14 when the contraction speed is in the very low-speed range, mainly by the orifice 30i when the contraction speed is in the low-speed range, and mainly by the primary valve 31 when the contraction speed is in the high-speed range.

As described above, the shock absorber D1 according to the present embodiment includes the damping passage DP, the primary damping force generation component MD, and the secondary damping force generation component SD. The damping passage DP communicates the compression side chamber R4 with the reservoir R. The primary damping force generation component MD and the secondary damping force generation component SD are provided in series with the damping passage DP. The primary damping force generation component MD has the primary valve 31. The secondary damping force generation component SD has the secondary valve 14, the annular facing portion 6c, and the valve stopper 13. The annular facing portion 6c faces the secondary valve 14 with the annular gap P therebetween. The valve stopper 13 having elasticity restricts the secondary valve 14 from bending when coming into contact with the secondary valve 14. Even if the extension and contraction speed of the shock absorber D1 configured in this way reaches the very high-speed range, it is possible to generate the damping force by the primary valve 31 in the primary damping force generation component MD, preventing the damping force from being excessive. Thus, the shock absorber D1 according to the present embodiment makes it possible to improve the vehicle ride quality, reducing or eliminating abnormal noise from occurring.

As described above, the damping passage DP can communicate the extension side chamber R1 with the compression side chamber R2, or can communicate the compression side chamber R4 with the reservoir R. In addition, it is also possible to employ a configuration in which the damping passage DP, the primary damping force generation component MD, and the secondary damping force generation component SD are provided on each of the piston side and the valve case side, instead of the rod 36 and the piston 37 of the shock absorber D1. In this case, it is possible to use the rod 2, the piston 3, the extension side leaf valve 4, the compression side leaf valve 7, the secondary valve case 6, and the secondary valve 14 of the shock absorber D.

The preferred embodiments of the present invention have been described in detail above, but modifications, variations, and alterations can be made without departing from the scope of the claims.

What is claimed is:

1. A shock absorber comprising:
a shock absorber main body having an outer tube and a rod and configured to be extendable and contractable, the rod being inserted movably into the outer tube;
a damping passage configured to communicate two operating chambers provided in the shock absorber main body; and
primary and secondary damping force generation components provided in series with the damping passage,
wherein the secondary damping force generation component includes a secondary valve, an annular facing portion, and a valve stopper,
the secondary valve is annular with elasticity and is provided in the damping passage, one of inner and outer circumferences of the secondary valve being fixed to be a fixed end and an other of the inner and outer circumferences of the second valve being a free end to allow bending,
the annular facing portion faces the free end of the secondary valve with an annular gap between the annular facing portion and the free end of the secondary valve, and
the valve stopper is annular and faces the secondary valve in an axial direction with a gap between the valve stopper and the secondary valve, and when the secondary valve bends and comes into contact with the valve stopper, holds back the secondary valve from further bending,
wherein the valve stopper has an inner circumference used as a fixed end in a case of using the inner circumference of the secondary valve as the fixed end, and
the valve stopper, in a case of using the outer circumference of the secondary valve as the fixed end, has an outer circumference used as a fixed end and an opposite circumference used as a free end, allowing the free end to bend together with the secondary valve while supporting the secondary valve.

2. The shock absorber according to claim 1, wherein the valve stopper is higher in flexural rigidity than the secondary valve.

3. The shock absorber according to claim 1, wherein the primary damping force generation component has a primary valve that opens and closes the damping passage, and
in a state in which the secondary valve is in contact with the valve stopper, a flow path area of the primary valve at opening is wider all the time than a flow path area of the annular gap between the secondary valve and the annular facing portion.

4. The shock absorber according to claim 1, wherein the primary damping force generation component has a primary valve that opens when a differential pressure between the operating chambers reaches a first differential pressure, and
the secondary valve
comes into contact with the valve stopper when the differential pressure reaches a second differential pressure equal to or higher than the first differential pressure.

5. The shock absorber according to claim 1, wherein the valve stopper
is formed as a plurality of stacked annular plates.

6. The shock absorber according to claim 1, wherein in the case of the free end of the valve stopper is the outer circumference, an outer diameter of the valve stopper is gradually or continuously reduced from a side of the secondary valve to an opposite side of the secondary valve, and
in the case of the free end of the valve stopper is the inner circumference, an inner diameter of the valve stopper is gradually or continuously decreased from the secondary valve side to an opposite side of the secondary valve.

* * * * *